US008686079B2

(12) United States Patent
Peters

(10) Patent No.: US 8,686,079 B2
(45) Date of Patent: *Apr. 1, 2014

(54) COMPATIBILIZED COMPOSITION, METHOD FOR THE FORMATION THEREOF, AND ARTICLE COMPRISING SAME

(75) Inventor: Edward Norman Peters, Lenox, MA (US)

(73) Assignee: Sabic Innovative Plastics IP B.V. (NL)

( * ) Notice: Subject to any disclaimer, the term of this patent is extended or adjusted under 35 U.S.C. 154(b) by 46 days.

This patent is subject to a terminal disclaimer.

(21) Appl. No.: 13/446,162

(22) Filed: Apr. 13, 2012

(65) Prior Publication Data

US 2013/0274393 A1 Oct. 17, 2013

(51) Int. Cl.
*C08K 9/06* (2006.01)

(52) U.S. Cl.
USPC .......................................... 524/423; 524/118

(58) Field of Classification Search
USPC .......................................................... 423/423
See application file for complete search history.

(56) References Cited

U.S. PATENT DOCUMENTS

| 3,306,874 | A | 2/1967 | Hay |
| 3,409,581 | A | 11/1968 | Hagan, Jr. |
| 3,631,126 | A | 12/1971 | Snodgrass et al. |
| 4,853,423 | A | 8/1989 | Walles et al. |
| 4,912,172 | A | 3/1990 | Hallgren et al. |
| 5,108,842 | A | 4/1992 | Hallgren et al. |
| 5,141,791 | A | 8/1992 | Chao et al. |
| 5,916,496 | A | 6/1999 | Weber |
| 6,194,496 | B1 | 2/2001 | Weber et al. |
| 6,770,691 | B2 | 8/2004 | Yeager |
| 7,671,167 | B2 | 3/2010 | Carrillo et al. |
| 8,025,158 | B2 | 9/2011 | Delsman et al. |
| 2005/0154130 | A1 | 7/2005 | Adedeji et al. |
| 2006/0079642 | A1 | 4/2006 | Adedeji et al. |
| 2006/0135695 | A1 | 6/2006 | Guo et al. |
| 2007/0238831 | A1 | 10/2007 | Klei et al. |
| 2007/0287801 | A1 | 12/2007 | Davis et al. |
| 2012/0329939 | A1* | 12/2012 | Peters .......................... 524/505 |

FOREIGN PATENT DOCUMENTS

| PL | 164813 B1 | 6/1992 |
| WO | 9532243 | 11/1995 |
| WO | 2009104107 A1 | 8/2009 |

OTHER PUBLICATIONS

US 6,159,264, 12/2000, Holl (withdrawn).
International Search Report for International Application No. PCT/US2012/069339, International Application Filing Date Dec. 13, 2012; Date of Mailing Apr. 25, 2013, 7 pages.
Written Opinion for International Application No. PCT/US2012/069339, International Application Filing Date Dec. 13, 2012; Date of Mailing Apr. 25, 2013, 4 pages.
International Search Report for International Application No. PCT/US2012/069340, International Application Filing Date Dec. 13, 2012; Date of Mailing Apr. 25, 2013, 7 pages.
Written Opinion for International Application No. PCT/US2012/069340, International Application Filing Date Dec. 13, 2012; Date of Mailing Apr. 25, 2013, 5 pages.
Chiang et al., "Polymer blends of polyamide-6 (PA6) and poly(phenylene ether) (PPE) compatibilized by a multifunctional epoxy coupler", Journal of Polymer Science: Part B: Polymer Physics, 1998, vol. 36, No. 11, pp. 1805-1819, Abstract only, 3 pages.
International Search Report and Written Opinion; International Application No. PCT/US2012/040647; International Filing Date Jun. 4, 2012; Date of Mailing Dec. 36, 2012; 8 pages.
JP 05-125234 Abstract; Application 03-292613; filed Nov. 8, 1991; "Thermoplastic Resin Composition"; 1 page.
Co-Pending U.S. Appl. No. 13/169,122, filed Jun. 27, 2011.
Co-Pending U.S. Appl. No. 13/415,016, filed Mar. 8, 2012.
Chao et al.; "Poly(2,6-Dimethyl-1,4-Phenylene Ether) (PPE) Redistribution and Its Significance in the Preparation of PPE/Epoxy Laminate"; Reactive Polymers, 15; pp. 9-23; (1991).
Christiansen et al., "The Phase Behavior of Ternary Blends Containing Polycarbonate, Phenoxy, and Polycaprolactone", Journal of Applied Polymer Science, vol. 34, pp. 537-548, 1987.
Coleman et al., "FTi.r. studies of polymer blends containing the poly(hydroxy ether of bisphenol A) and pol(e-caprolactone)", Polymer, vol. 24, pp. 251-256, 1983.
D.E.R. 317 Liquid Epoxy Resin, DOW Product Information Sheet, downloaded from http://msdssearch.dow.com/PublishedLiteratureDOWCOM/dh_01e8/0901b803801e8ef1.pdf?filepath=epoxy/pdfs/noreg/296-01533.pdf&fromPage=GetDoc on Sep. 14, 2011, 3 pages.
D.E.R. 6155 Solid Epoxy Resin, DOW Product Information, downloaded from http://msdssearch.dow.com/PublishedLiteratureDOWCOM/dh_02db/0901b803802db6cb.pdf?filepath=epoxy/pdfs/noreg/296-01592.pdf&fromPage=GetDoc, on Sep. 14, 2011, 3 pages.
D.E.R. 667E Solid Epoxy Resin, DOW Product Information Sheet, downloaded from http://msdssearch.dow.com/PublishedLiteratureDOWCOM/dh_02db/0901b803802db68b.pdf?filepath=epoxy/pdfs/noreg/296-01489.pdf&fromPage=GetDoc on Sep. 14, 2011, 3 pages.
D.E.R. 668-20 Solid Epoxy Resin, DOW Product Information, downloaded from http://msdssearch.dow.com/PublishedLiteratureDOWCOM/dh_02db/0901b803802db6a0.pdf?filepath=epoxy/pdfs/noreg/296-01479.pdf&fromPage=GetDoc on Sep. 14, 2011, 3 pages.
Dekkers et al., Morphology and deformation behaviour of toughened blends of poly(butylene terephthalate), polycarbonate and poly(phenylene ether), Polymer, vol. 32, No. 12, pp. 2150-2153 1991.
DOW Answer Center, "DOW Epoxy—Type Definition", last updated Aug. 13, 2010, 1 page, retrieved from http://dow-answer.custhelp.com/app/answers/detail/a_id/9928/~/dow-epoxy---type-definition on Mar. 7, 2011.
Eguiazabal et al., "Glass transition temperatures in blends of poly(N-vinyl-2-pyrrolidone) with a copolymer of bisphenol A and epichlorohydrin or with poly(vinyl butyral)", Makromol. Chem. 185, pp. 1761-1766, 1984.
EPON Resin 1001F, Technical Data Sheet, Re-issued Sep. 2007, downloaded from http://www.hexion.com/Products/TechnicalDataSheet.aspx?id=4017, on Sep. 14, 2011, 4 pages.

(Continued)

*Primary Examiner* — Doris Lee
(74) *Attorney, Agent, or Firm* — Cantor Colburn LLP

(57) ABSTRACT

A poly(phenylene ether)-poly(hydroxy ether) block copolymer is used to compatibilize blends of non-polar polymers with polar fillers. The resulting compatibilized blends exhibit physical property improvements relative to blends without a compatibilizer and blends with a poly(hydroxy ether).

20 Claims, 2 Drawing Sheets

(56) References Cited

OTHER PUBLICATIONS

EPON Resin 1002F, Technical Data Sheet, Re-issued Sep. 2007, downloaded from http://www.hexion.com/Products/TechnicalDataSheet.aspx?id=4025 on Sep. 14, 2011, 4 pages.

EPON Resin 1007F, Technical Data Sheet, Re-issued Sep. 2007, downloaded from http://www.hexion.com/Products/TechnicalDataSheet.aspx?id=4029 on Sep. 14, 2011, 4 pages.

Harris et al., "Miscible Binary Blends Containing the Polyhydroxy Ether of Bisphenol-A and Various Aliphatic Polyesters", Journal of Applied Polymer Sciences, vol. 27, 839-855, 1982.

Hobbs et al., "Reactive Processing of Blends of Functionalized Poly(2,6-dimethyl-1,4 phenylene oxide) and Poly (butylene terephthalate)", Polymer Preprints, vol. 33, No. 2, pp. 614-615, 1992.

Iribarren, et al.; "Phenoxy Resin: Characterization, Solution Properties, and Inverse Gas Chromatography Investigation of Its Potential Miscibility with Other Polymers"; Journal of Applied Science; 37; pp. 3459-3470; (1989).

Jang et al., "Performance Improvement of Glass-Fiber-Reinforced Polystyrene Composite Using a Surface Modifier. II. Mechanical Properties of Composites", Journal of Applied Polymer Science, vol. 59, pp. 2069-2077, 1996.

Lee et al., New Linear Polymers, "Phenoxy Resins" and "Properties of Adhesive Compounds", 1967, McGraw-Hill Inc. Book Company New York, 5 pages.

Liu et al., "In SITU Compatibilization of PBT/PPO Blends", Eur. Polym. J. vol. 32, No. 1, pp. 91-99, 1996.

Lo et al., "Reactive Compatibilation of PET and PPE Belends of Epoxy Couplers", J. Appl. Polym. Sci. 65, pp. 739-753, 1997.

Peters et al. "Engineering Thermoplastics", Applied Polymer Science, pp. 177-196, 2000.

Peters, "Introduction to Polymer Characterization", Chapter 1—Comprehensive Desk Reference of Polymer Characterization and Analysis, pp. 3-29, 2003.

Peters, "Polyphenylene Ether (PPE) Blends and Alloys", Chapter 9—Engineering Plastics Handbook, pp. 181-220, 2006.

Peters, "Poly(2,6-dimethyl-1,4-phenylene oxide)", Polymer Data Handbook, 2nd Edition, pp. 534-537, 2009.

PPO* Resin 640, SABIC Data Sheet, downloaded from http://kbam.geampod.com/KBAM/Reflection/Assets/20423.pdf, on Sep. 14, 2011, 1 page.

PPO* Resin SA90, SABIC Data Sheet, downloaded from http://www.sabic-ip.com/gepapp/eng/weather/weatherhtml?sltRegionList=1002002000&sltPrd=1002003013&sltGrd=1002041836&sltUnit=0&sltModule=DATASHEETS&sltVersion=Internet&sltType=Online, on Sep. 14, 2011, 1 page.

PPO* SA90-100, SABIC Data Sheet, downloaded from http://www.sabic-ip.com/resins/DataSheet/Internet/HTML1002002000_1002003013_1002040979_Metric.htm, on Mar. 7, 2011, 2 pages.

Reinking, et al.; "Polyhydroxyethers. I. Effect of Structure on Properties of High Molecular Weight Polymers from Dihydnc Phenols and Epichlorodydrin"; Journal of Applied Polymer Science, vol. 7, 1963, pp. 235-2144.

Rejdych et al., "Synthesis and properties of block diepoxides oligo(xylylen oxy)diepoxides", Polymers—Plastic Macromolecular 40, No. 2, 1995, 12 pages, English Translation.

Robeson et al., "Miscible Blends of Poly(butylene terephthalate) and the Polyhydroxyether of Bisphenol A", Journal of Applied Polymer Science, vol. 23, pp. 645-659, 1979.

Robeson, et al.; "Miscibility of the Poly(hydroxy ether) of Bisphenol A with Water-Soluble Polyethers"; Macromolecules 14, 1981, pp. 1644-1650.

Singh et al., "The Miscibility of Polyethersulfone with Phenoxy Resin", Journal of Macromolecular Science—Physics, B25(1&2), pp. 65-87, 1986.

Uriarte, et al., "Miscibility and Phase Separation in Poly(vinyl methylether)/Poly(bisphenol A hydroxy ether) Blends", Macromolecules 20, 1987, pp. 3038-3042.

Yamamoto, "With block *graft copolymer improvement and compatibilization of polymer", J. Jap. Rup. Soc., vol. 62, 14 pages, 1990, Machine Translation.

U.S. Appl. No. 13/756,692, filed Feb. 1, 2013.

* cited by examiner

COMPATIBILIZED COMPOSITION, METHOD FOR THE FORMATION THEREOF, AND ARTICLE COMPRISING SAME

BACKGROUND OF THE INVENTION

In polymer blends, poly(hydroxy ether)s (also known as phenoxy resins) form miscible blends with a variety of with polar polymers, such as aliphatic polyesters (see, for example, J. E. Harris, S. H. Goh, D. R. Paul, and J. W. Barlow, *Journal of Applied Polymer Science*, volume 27, page 839 ff. (1982)), aromatic polyesters (see, for example, L. M. Robeson and A. B. Furtek, *Journal of Applied Polymer Science*, volume 23, page 645 ff. (1979); and W. H. Christiansen, D. R. Paul, and J. W. Barlow, *Journal of Applied Polymer Science*, volume 34, page 537 ff. (1987)), polyethers and polyoxides (see, for example, L. M. Robeson, W. F. Hale, and C. N. Merriam, *Macromolecules*, volume 14, page 1644 ff. (1981); and J. I. Iribarren, M. Iriarte, C. Uriarte, J. J. Iruin, *Journal of Applied Polymer Science*, volume 37, page 3459 ff. (1989)), polysulfones (see, for example, V. B. Singh and D. J. Walsh, *Journal of Macromolecular Science, Part B: Phys.*, volume B25, page 65 ff. (1987)), and poly(N-vinyl-2-pyrrolidone)s (see, for example, J. I. Eguiazabal, J. J. Iruin, M. Cortazar, and G. M. Guzman, *Makromolekulare Chemie*, volume 185, page 1761 ff. (1984)). In addition, poly(hydroxy ether)s have shown utility in compatibilizing blends of diverse polar polymers like polyurethanes, polyesters, and nylons (see, for example, C. Uriarte, J. I. Eguiazabal, M. Llanos, J. I. Iribarren, J. J. Iruin, *Macromolecules*, volume 20, pages 3038-3042 (1987); and H. E. Snodgrass, R. L. Lauchlan, U.S. Pat. No. 3,631,126, issued Dec. 28, 1971).

Poly(hydroxy ether)s contain about six percent by weight secondary alcohol (hydroxyl) groups that can interact with polar functional groups in other polymers and substrates. The existence of such interactions and their influence on the miscibility of polar polymer blends has been shown by Fourier transform infrared spectroscopy (see, for example, E. J. Moskala and M. M. Coleman, *Polymer Communications*, volume 24, page 206 ff. (1983); and M. M. Coleman and E. J. Moskala, *Polymer*, volume 24, page 251 ff. (1983)). In general, however, poly(hydroxy ether)s are incompatible with non-polar polymers, including aromatic non-polar polymers such as poly(alkenyl aromatic)s, poly(phenylene ether)s, and unhydrogenated and hydrogenated block copolymers of alkenyl aromatic compounds and conjugated dienes. Furthermore, although polar filler can be reacted with surface treatment agents to improve their compatibility with non-polar polymers, further improvements in the compatibilization of non-polar polymers and polar fillers are needed.

Thus, there remains a need for materials capable of compatibilizing blends of non-polar polymers and polar substrates, such as the surfaces of inorganic fillers.

BRIEF DESCRIPTION OF THE INVENTION

In copending U.S. patent application Ser. No. 13/169,122, filed 27 Jun. 2011, the synthesis of block copolymers with poly(hydroxy ether) segments and poly(phenylene ether) segments is described. In copending U.S. patent application Ser. No. 13/415,016, filed 8 Mar. 2012, the use of poly(phenylene ether)-poly(hydroxy ether) block copolymers to compatibilize blends of polar polymers and non-polar polymers is described. In the present application, the poly(phenylene ether)-poly(hydroxy ether) block copolymers are used to compatibilize blends of non-polar polymers and fillers with polar surfaces.

One embodiment is a composition comprising: about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein all weight percents are based on the total weight of the composition, unless a different weight basis is specified.

Another embodiment is a composition comprising: about 35 to about 90 weight percent of a poly(alkenyl aromatic); about 5 to about 45 weight percent of glass fibers; and about 5 to about 20 weight percent of a poly(phenylene ether)-poly (hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein the at least one poly(phenylene ether) block has the structure

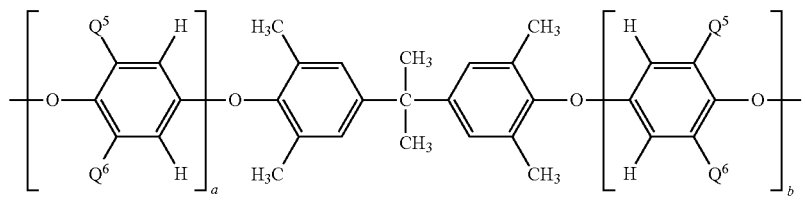

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

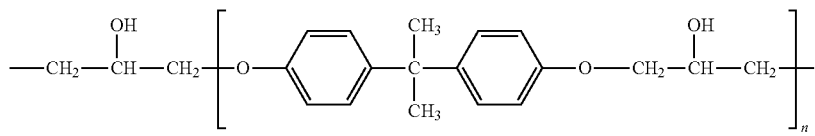

wherein n is about 1 to about 60; wherein all weight percents are based on the total weight of the composition, unless a different weight basis is specified.

Another embodiment is a composition comprising: about 35 to about 90 weight percent of a poly(phenylene ether); about 5 to about 45 weight percent of glass fibers; and about 5 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein the at least one poly(phenylene ether) block has the structure

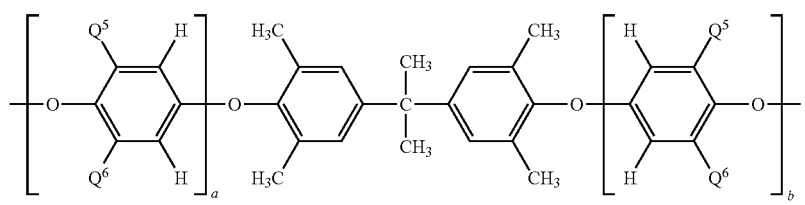

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

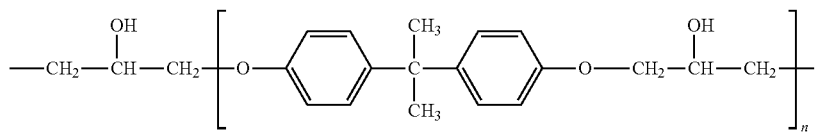

wherein n is about 1 to about 60; wherein all weight percents are based on the total weight of the composition, unless a different weight basis is specified.

Another embodiment is an article comprising the composition of claim 1.

Another embodiment is a method of forming a composition, comprising: blending about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof, about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof, and about 2 to about 20 weight percent of a poly(phenylene ether)-poly(hydroxy ether) block copolymer comprising at least one poly(hydroxy ether) block, and at least one poly(phenylene ether) block, wherein the mole ratio of poly(hydroxy ether) blocks to poly(phenylene ether) blocks is 0.95:1 to 1.00:1 to form a composition; wherein all weight percents are based on the total weight of the composition, unless a different weight basis is specified.

These and other embodiments are described in detail below.

DETAILED DESCRIPTION OF THE INVENTION

Figure 1:
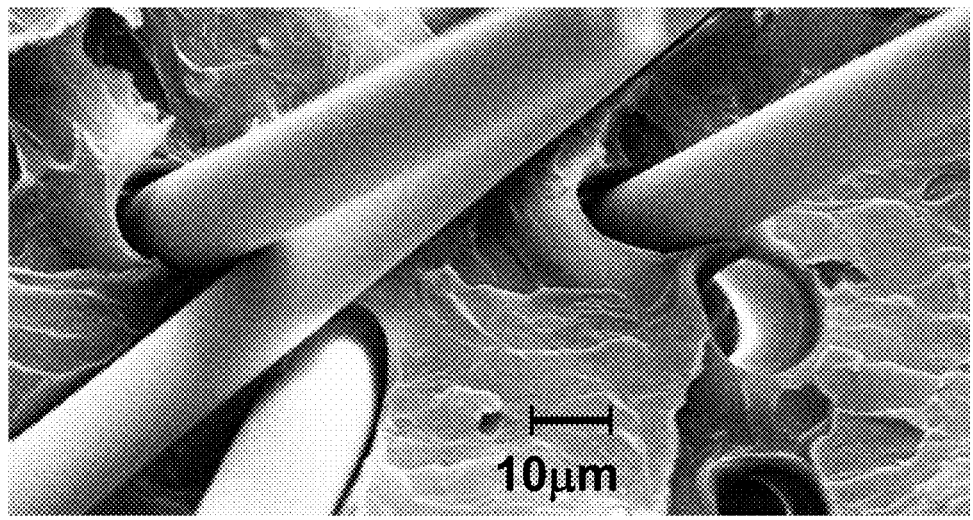
FIG. 1 is an electron micrograph of a sample prepared from the Comparative Example 1 composition with no compatibilizer. Physical separation of the glass fiber and the polystyrene matrix is observed.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The present inventor has determined that poly(phenylene ether)-poly(hydroxy ether) block copolymers having a mole ratio of poly(hydroxy ether) blocks to poly(phenylene ether) blocks of 0.95:1 to 1.00:1 are effective compatibilizers for non-polar polymers and polar fillers. The compatibilization of the non-polar polymers and polar fillers is manifested as greater stiffness, toughness, and heat resistance of the resulting compositions compared to corresponding compositions containing no compatibilizer or a poly(hydroxy ether) compatibilizer. Thus, one embodiment is a composition comprising: about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein all weight percents are based on the total weight of the composition, unless a different weight basis is specified.

The composition comprises a non-polar polymer. Suitable non-polar polymers include unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof.

The non-polar polymer can be an unhydrogenated block copolymer of an alkenyl aromatic compound and a conjugated diene. For brevity, this component is referred to as an "unhydrogenated block copolymer". The unhydrogenated block copolymer can comprise about 10 to about 90 weight percent of poly(alkenyl aromatic) content and about 90 to about 10 weight percent of poly(conjugated diene) content, based on the weight of the unhydrogenated block copolymer. In some embodiments, the unhydrogenated block copolymer is a low poly(alkenyl aromatic content) unhydrogenated block copolymer in which the poly(alkenyl aromatic) content is about 10 to less than 40 weight percent, specifically about 20 to about 35 weight percent, more specifically about 25 to about 35 weight percent, yet more specifically about 30 to about 35 weight percent, all based on the weight of the low poly(alkenyl aromatic) content unhydrogenated block copolymer. In other embodiments, the unhydrogenated block copolymer is a high poly(alkenyl aromatic) content unhydrogenated block copolymer in which the poly(alkenyl aromatic) content is 40 to about 90 weight percent, specifically about 50 to about 80 weight percent, more specifically about 60 to about 70 weight percent, all based on the weight of the high poly(alkenyl aromatic) content unhydrogenated block copolymer.

In some embodiments, the unhydrogenated block copolymer has a weight average molecular weight of about 40,000 to about 400,000 atomic mass units. The number average molecular weight and the weight average molecular weight can be determined by gel permeation chromatography and based on comparison to polystyrene standards. In some embodiments, the unhydrogenated block copolymer has a weight average molecular weight of about 200,000 to about 400,000 atomic mass units, specifically about 220,000 to about 350,000 atomic mass units. In other embodiments, the unhydrogenated block copolymer has a weight average molecular weight of about 40,000 to about 200,000 atomic mass units, specifically about 40,000 to about 180,000 atomic mass units, more specifically about 40,000 to about 150,000 atomic mass units.

The alkenyl aromatic monomer used to prepare the unhydrogenated block copolymer can have the structure

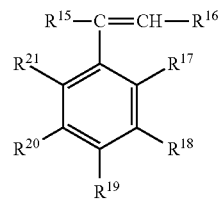

wherein $R^{15}$ and $R^{16}$ each independently represent a hydrogen atom, a $C_1$-$C_8$ alkyl group, or a $C_2$-$C_8$ alkenyl group; $R^{17}$ and $R^{21}$ each independently represent a hydrogen atom, a $C_1$-$C_8$ alkyl group, a chlorine atom, or a bromine atom; and $R^{20}$, $R^{21}$, and $R^{20}$ each independently represent a hydrogen atom, a $C_1$-$C_8$ alkyl group, or a $C_2$-$C_8$ alkenyl group, or $R^{18}$ and $R^{19}$ are taken together with the central aromatic ring to form a naphthyl group, or $R^{19}$ and $R^{20}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the unhydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene, 2-methyl-1,3-butadiene, or a combination thereof. In some embodiments, the conjugated diene consists of 1,3-butadiene.

The unhydrogenated block copolymer is a copolymer comprising (A) at least one block derived from an alkenyl aromatic compound and (B) at least one block derived from a conjugated diene. The arrangement of blocks (A) and (B) includes a linear structure, a grafted structure, and a radial teleblock structure with or without a branched chain. Linear block copolymers include tapered linear structures and non-tapered linear structures. In some embodiments, the unhydrogenated block copolymer has a tapered linear structure. In some embodiments, the unhydrogenated block copolymer has a non-tapered linear structure. In some embodiments, the unhydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the unhydrogenated block copolymer is a diblock copolymer, a triblock copolymer, or a combination thereof.

In some embodiments, the unhydrogenated block copolymer excludes the residue of monomers other than the alkenyl aromatic compound and the conjugated diene. In some embodiments, the unhydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the unhydrogenated block copolymer includes the residue of one or more acid functionalizing agents, such as maleic anhydride.

In some embodiments, the unhydrogenated block copolymer comprises a polystyrene-polybutadiene-polystyrene triblock copolymer. In some embodiments, the unhydrogenated block copolymer comprises a polystyrene-polyisoprene-polystyrene triblock copolymer.

Methods for preparing unhydrogenated block copolymers are known in the art and unhydrogenated block copolymers are commercially available. Illustrative commercially available unhydrogenated block copolymers include the polystyrene-polybutadiene-polystyrene triblock copolymers from Kraton Performance Polymers Inc. under the trade names D1101 and D1102; and the styrene-butadiene radial teleblock copolymers from Chevron Phillips Chemical Company under the trade names K-RESIN KR01, KR03, and KR-05.

The non-polar polymer can be a hydrogenated block copolymer of an alkenyl aromatic compound and a conjugated diene. For brevity, this component is referred to as a "hydrogenated block copolymer". The hydrogenated block copolymer is the same as the unhydrogenated block copolymer, except that in the hydrogenated block copolymer the aliphatic unsaturated group content in the block (B) derived from a conjugated diene is at least partially reduced by hydrogenation. In some embodiments, the aliphatic unsaturation in the (B) block is reduced by at least 50 percent, specifically at least 70 percent, more specifically at least 90 percent.

Illustrative commercially available hydrogenated block copolymers include the polystyrene-poly(ethylene-propylene) diblock copolymers available from Kraton Performance Polymers Inc. as KRATON G1701 and G1702; the polystyrene-poly(ethylene-butylene)-polystyrene triblock copolymers available from Kraton Performance Polymers Inc. as KRATON G1641, G1650, G1651, G1654, G1657, G1726, G4609, G4610, GRP-6598, MD-6932M, MD-6933, and MD-6939; the polystyrene-poly(ethylene-propylene)-polystyrene triblock copolymers available from Kraton Performance Polymers Inc. as KRATON G1730; the maleic anhydride-grafted polystyrene-poly(ethylene-butylene)-polystyrene triblock copolymers available from Kraton Performance Polymers Inc. as KRATON G1901, G1924, and MD-6684; the maleic anhydride-grafted polystyrene-poly(ethylene-butylene-styrene)-polystyrene triblock copolymer available from Kraton Performance Polymers Inc. as KRATON MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-poly(ethylene-butylene)-polystyrene triblock copolymer comprising 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising 65 weight percent polystyrene available from Kuraray as SEPTON S2104.

The non-polar polymer can be a poly(alkenyl aromatic). As used herein, the term "poly(alkenyl aromatic)" refers to a homopolymer of an alkenyl aromatic monomer, a copolymer of two or more alkenyl aromatic monomers, a rubber-modified derivative of one of the foregoing polymers, or a combination thereof. The alkenyl aromatic monomer is described above in the context of the unhydrogenated block copolymer. Representative poly(alkenyl aromatic)s include atactic polystyrenes, syndiotactic polystyrenes, isotactic polystyrenes, and rubber-modified polystyrenes. In some embodiments, the poly(alkenyl aromatic) comprises an atactic polystyrene. In some embodiments, the poly(alkenyl aromatic) comprises a syndiotactic polystyrene. In some embodiments, the poly(alkenyl aromatic) comprises a rubber-modified polystyrene comprising 80 to 96 weight percent polystyrene content, specifically 88 to 94 weight percent polystyrene content; and 4 to 20 weight percent polybutadiene content, specifically 6 to 12 weight percent polybutadiene content, based on the weight of the rubber-modified polystyrene. In some embodiments, the poly(alkenyl aromatic) comprises an atactic polystyrene and a rubber-modified polystyrene. Commercially available poly(alkenyl aromatic)s include the atactic polystyrenes available as EA3130-AMST from Americas Styrenics LLC and as ESPREE CPS15GP from SABIC Innovative Plastics; the syndiotactic polystyrene available as EDTEK QT-30GF/000 Natural from PolyOne Corporation; and the rubber-modified polystyrenes available as EB6400-AMST from Americas Styrenics LLC and as HIPS3190 from SABIC Innovative Plastics.

The non-polar polymer can be a poly(phenylene ether). Suitable poly(phenylene ether)s include those comprising repeating structural units having the formula

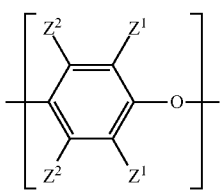

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of about 0.25 to about 1 deciliter per gram measured at 25° C. in chloroform. Within this range, the poly(phenylene ether) intrinsic viscosity can be about 0.3 to about 0.65 deciliter per gram, more specifically about 0.35 to about 0.5 deciliter per gram, even more specifically about 0.4 to about 0.5 deciliter per gram.

In some embodiments, the poly(phenylene ether) is essentially free of incorporated diphenoquinone residues. In the context, "essentially free" means that the fewer than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues). For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in U.S. Pat. No. 8,025,158 B2 to Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of about 0.35 to about 0.5 deciliter per gram, specifically about 0.35 to about 0.46 deciliter per gram, measured at 25° C. in chloroform.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer.

The poly(phenylene ether) can be prepared by oxidative polymerization of one or more monohydric phenols. Commercially available poly(phenylene ether)s include those from Asahi Kasei Chemicals Corporation under the trade name XYRON, and from SABIC Innovative Plastics under the trade name PPO.

In some embodiments, the non-polar polymer is selected from the group consisting of poly(alkenyl aromatic)s, and combinations of poly(alkenyl aromatic)s with one or more of unhydrogenated block copolymers of alkenyl aromatic compounds and conjugated dienes, hydrogenated block copolymers of alkenyl aromatic compounds and conjugated dienes, and poly(phenylene ether)s. The poly(alkenyl aromatic) can be an atactic homopolystyrene, a syndiotactic homopolystyrene, a rubber-modified polystyrene, or a combination thereof. In some embodiments, the poly(alkenyl aromatic) is an atactic homopolystyrene. In some embodiments, the poly(alkenyl aromatic) is a syndiotactic homopolystyrene.

In some embodiments, the non-polar polymer is selected from the group consisting of poly(phenylene ether)s, and combinations of poly(phenylene ether)s with one or more of unhydrogenated block copolymers of alkenyl aromatic compounds and conjugated dienes, hydrogenated block copolymers of alkenyl aromatic compounds and conjugated dienes, and poly(alkenyl aromatic)s.

In some embodiments, the non-polar polymer is selected from the group consisting of combinations of poly(phenylene ether)s and poly(alkenyl aromatic)s, optionally in further combination with one or more of unhydrogenated block copolymers of alkenyl aromatic compounds and conjugated dienes, and hydrogenated block copolymers of alkenyl aromatic compounds and conjugated dienes.

In some embodiments, the non-polar polymer is selected from the group consisting of combinations of poly(phenylene ether)s and hydrogenated block copolymers of alkenyl aromatic compounds and conjugated dienes, optionally in further combination with one or more of unhydrogenated block copolymers of alkenyl aromatic compounds and conjugated dienes, and poly(alkenyl aromatic)s.

In some embodiments, the non-polar polymer is selected from the group consisting of combinations of poly(phenylene ether)s and unhydrogenated block copolymers of alkenyl aromatic compounds and conjugated dienes, optionally in further combination with one or more of hydrogenated block copolymers of alkenyl aromatic compounds and conjugated dienes, and poly(alkenyl aromatic)s.

The composition comprises the non-polar polymer in an amount of about 30 to about 93 weight percent, based on the total weight of the composition. Within this range, the non-polar polymer amount can be about 40 to about 86 weight percent, specifically about 45 to about 74 weight percent, more specifically about 50 to about 64 weight percent.

In addition to the non-polar polymer, the composition comprises a polar filler. As used herein, the term "polar filler" refers to a filler comprising a surface capable of an energetically favorable interaction with a poly(hydroxy ether) block of the poly(phenylene ether)-poly(hydroxy ether) block copolymer. The energetically favorable interaction may include, for example, one or more of hydrogen bonding, dipole-dipole interactions, and London dispersion forces. Suitable polar fillers include glass fibers, glass flakes, glass beads (including hollow glass beads), clays, talcs, micas, silicas, aluminas, titanium dioxides, wollastonites, calcium carbonates, calcium sulfates, barium sulfates, dolomites (calcium magnesium carbonates), processed mineral fibers (i.e., man-made vitreous silicate fibers formed by the melt spinning of furnace slags and other minerals), metal oxides (including aluminum oxides, zinc oxides, nickel oxides, bronze oxides, and copper oxides), metal hydroxides (including aluminum hydroxides), ceramic fibers (including those sold as NEXTEL Ceramic Fiber by 3M, and as FIBERFRAX Refractory Ceramic Fiber by Unifrax LLC), and combinations thereof.

In some embodiments, the polar filler includes glass fibers. Thus, the polar filler can be selected from the group consisting of glass fibers and combinations of glass fibers with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers.

In some embodiments, the polar filler includes clay, talc, mica, or a combination thereof. Thus, the polar filler can be selected from the group consisting of clays, talcs, micas, and combinations thereof, optionally in further combination with one or more of glass fibers, glass flakes, glass beads, silicas, aluminas, titanium dioxides, wollastonites, calcium carbonates, calcium sulfates, barium sulfates, dolomites, processed mineral fibers, metal oxides, metal hydroxides, and ceramic fibers.

In some embodiments, the polar filler is a surface-treated polar filler. Surface treated polar fillers are the product of a process comprising treating a polar filler with a (non-polymeric) surface treatment agent to enhance its compatibility with the non-polar polymer. Surface treatment agents include, for example, γ-aminopropyltrialkoxysilanes (including γ-aminopropyltrimethoxysilane and γ-aminopropyltriethoxysilane), γ-(meth)acryloxypropyltrialkoxysilanes (including γ-acryloxypropyltrimethoxysilane, γ-methacryloxypropyltrimethoxysilane, γ-acryloxypropyltriethoxysilane, and γ-methacryloxypropyltriethoxysilane), β-(3,4-epoxycyclohexyl)ethyltrialkoxysiloxanes (including β-(3,4-epoxycyclohexyl)ethyltrimethoxysiloxane and β-(3,4-epoxycyclohexyl)ethyltriethoxysiloxane), and combinations thereof. The amount of surface treatment agent relative to polar filler will vary with the polar filler type but is generally about 0.05 to about 5 weight percent, based on the weight of the polar filler. Similarly, the resulting surface-treated polar filler will generally comprise about 0.05 to about 5 weight percent of surface treatment agent residue.

The composition comprises the polar filler in an amount of about 5 to about 50 weight percent, based on the total weight of the composition. Within this range, the polar filler amount can be about 10 to about 40 weight percent, specifically about 15 to about 30 weight percent.

In addition to the non-polar polymer and the polar filler, the composition comprises a poly(phenylene ether)-poly(hydroxy ether) block copolymer. The poly(phenylene ether)-poly(hydroxy ether) block copolymer comprises at least one poly(hydroxy ether) block, and at least one poly(phenylene ether) block, and the mole ratio of poly(hydroxy ether) blocks to poly(phenylene ether) blocks is 0.95:1 to 1.00:1.

The poly(phenylene ether) block is derived from a telechelic poly(phenylene ether) having terminal phenolic hydroxy groups. A "phenolic hydroxyl group" is a hydroxyl group bonded to a substituted or unsubstituted benzene ring. The term "telechelic" is used to describe a linear polymer in which the two terminal end groups of the polymer chain have the same functionality. In some embodiments, the poly(phenylene ether) block has the structure

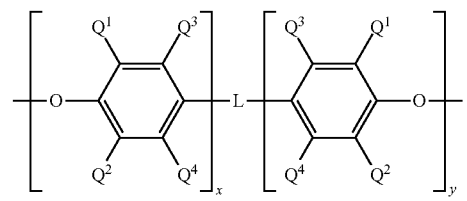

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, specifically 0 to about 20, more specifically 0 to about 15, still more specifically 0 to about 10, even more specifically 0 to about 8, with the proviso that the sum of x and y is at least 2, specifically at least 3, more specifically at least 4; and L has the structure

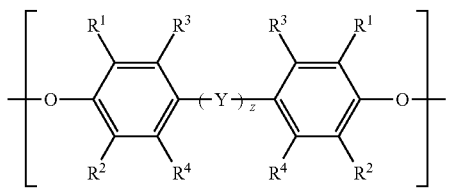

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

-continued

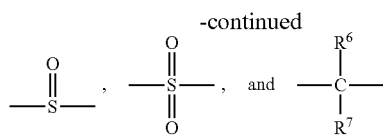

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group. In some embodiments, $Q^1$ is a di-n-butylaminomethyl group formed by reaction of a terminal 3,5-dimethyl-1,4-phenyl group with the di-n-butylamine component of an oxidative polymerization catalyst. In some embodiments, each occurrence of $Q^1$ and $Q^2$ is methyl, each occurrence of $Q^3$ is hydrogen, each occurrence of $Q^4$ is hydrogen or methyl, the sum of x and y is 2 to about 15, each occurrence of $R^1$ and $R^2$ and $R^3$ and $R^4$ is independently hydrogen or methyl, and Y has the structure

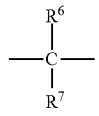

wherein each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group.

In the above structures, there are limitations on the variables x and y, which correspond to the number of phenylene ether repeating units at two different places in the bifunctional poly(phenylene ether) molecule. In the structure, x and y are independently 0 to about 30, specifically 0 to about 20, more specifically 0 to about 15, even more specifically 0 to about 10, yet more specifically 0 to about 8. The sum of x and y is at least 2, specifically at least 3, more specifically at least 4. A particular polyfunctional poly(phenylene ether) resin can be analyzed by proton nuclear magnetic resonance spectroscopy ($^1$H-NMR) to determine whether these limitations are met for the entire resin, on average. Specifically, $^1$H-NMR can distinguish between resonances for protons associated with internal and terminal phenylene ether groups, and internal and terminal residues of a polyhydric phenol, as well as other terminal residues. It is therefore possible to determine the average number of phenylene ether repeat units per molecule, and the relative abundance of internal and terminal residues derived from dihydric phenol.

In some embodiments, the at least one poly(phenylene ether) block has the structure

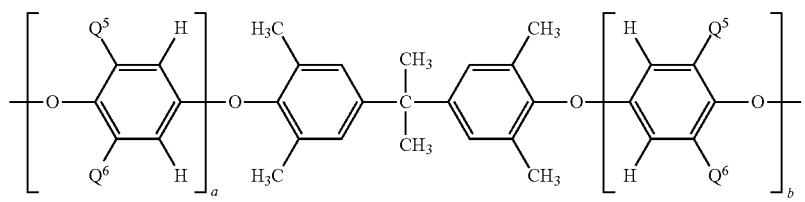

wherein each occurrence of $Q^5$ and $Q^6$ is independently methyl, di-n-butylaminomethyl, or morpholinomethyl; and each occurrence of a and b is independently 0 to about 20, with the proviso that the sum of a and b is at least 2, specifically at least 3, and more specifically at least 4.

The at least one poly(hydroxy ether) block has the structure

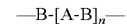

wherein A is a hydrocarbyl residue of valence 2, and B is a residue of structure

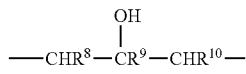

wherein $R^8$ to $R^{10}$ are each independently hydrogen, or $C_1$-$C_{12}$ hydrocarbyl; and n is about 1 to about 60.

In some embodiments, A is a residue having the structure

wherein each $G^1$ is independently at each occurrence a $C_6$-$C_{20}$ aromatic radical, and E is independently at each occurrence a direct bond, or a structure selected from

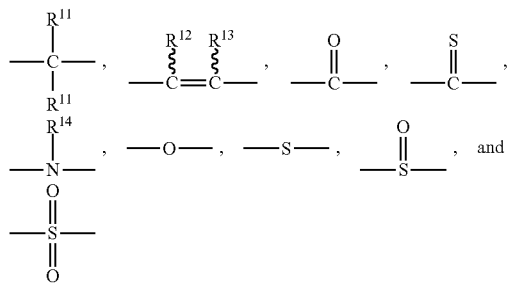

wherein each occurrence of $R^{11}$-$R^{14}$ is independently hydrogen or $C_1$-$C_{12}$ hydrocarbyl, s is 0 or 1, and t and u are each independently 1 to 10; and B is a residue of structure

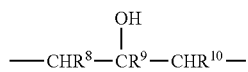

wherein $R^8$ to $R^{10}$ are each independently hydrogen, or $C_1$-$C_{12}$ hydrocarbyl; and n is about 1 to about 60.

In some embodiments, the at least one poly(hydroxy ether) block has the structure

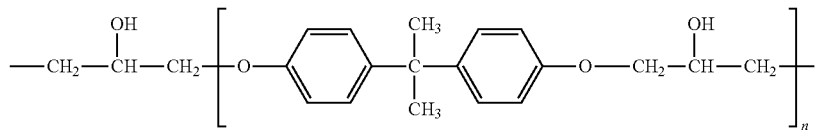

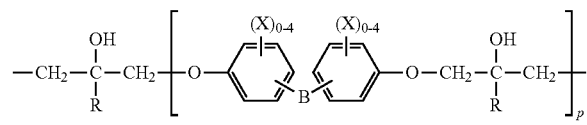

wherein each occurrence of R is independently hydrogen or methyl; each occurrence of X is independently hydrogen, chloro, fluoro, bromo, $C_1$-$C_{18}$ hydrocarbyl optionally further comprising a member or members selected from carboxy, carboxamide, ketone, aldehyde, alcohol, halogen, and nitrile; each occurrence of B is independently a carbon-carbon single bond, $C_1$-$C_{18}$ hydrocarbyl, $C_1$-$C_{12}$ hydrocarbyloxy, $C_1$-$C_{12}$ hydrocarbylthio, carbonyl, sulfide, sulfonyl, sulfinyl, phosphoryl, silane, or such groups further comprising a member or members selected from carboxyalkyl, carboxamide, ketone, aldehyde, alcohol, halogen, and nitrile; and p is independently 1 to about 20.

In some embodiments, the at least one poly(hydroxy ether) block has the structure

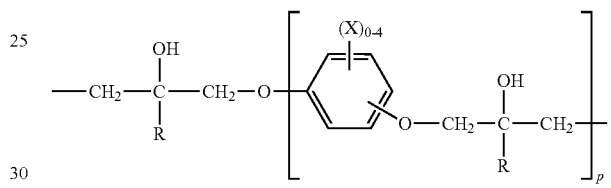

wherein R, X, and p are as defined above.

In some embodiments, the at least one poly(hydroxy ether) block has the structure wherein n is about 1 to about 60, specifically about 1 to about 40, more specifically about 1 to about 20.

In some embodiments, the at least one poly(phenylene ether) block has the structure

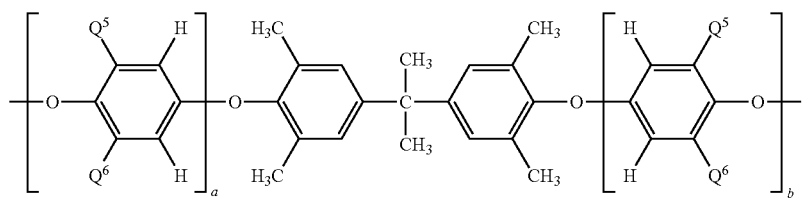

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and the at least one poly(hydroxy ether) block has the structure

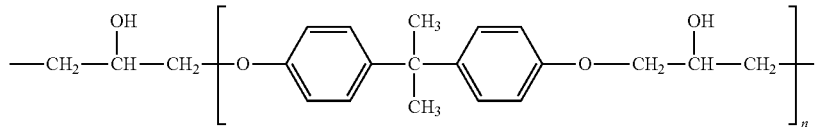

wherein n is about 1 to about 60.

In some embodiments, residue A of the poly(hydroxy ether) block is derived from a dihydroxy aromatic compound. Suitable dihydroxy aromatic compounds include resorcinol, catechol, hydroquinone, 1,5-dihydroxynaphthalene, 2,6-dihydroxynaphthalene, 2,7-dihydroxynapthalene, 2-(diphenylphosphoryl)hydroquinone, bis(2,6-dimethylphenol) 2,2'-biphenol, 4,4-biphenol, 2,2',6,6'-tetramethylbiphenyl, 2,2',3,3',6,6'-hexamethylbiphenyl, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenyl, 4,4'-isopropylidenediphenol(bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'-(1,3-phenylenediisopropylidene)bisphenol(bisphenol M), 4,4'-isopropylidenebis(3-phenylphenol), 4,4'-(1,4-phenylenediisoproylidene)bisphenol(bisphenol P), 4,4'-ethylidenediphenol (bisphenol E), 4,4'-oxydiphenol, 4,4'-thiodiphenol, 4,4'-thiobis(2,6-dimethylphenol), 4,4'-sulfonyldiphenol, 4,4'-sulfonylbis(2,6-dimethylphenol) 4,4'-sulfinyldiphenol, 4,4'-hexafluoroisoproylidene)bisphenol (Bisphenol AF), 4,4'-(1-phenylethylidene)bisphenol(Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol(spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol), dicyclopentadienyl bisphenol, 4,4'-dihydroxy-alpha-methylstilbene, and the like.

In some embodiments, residue A is derived from a dihydroxy aromatic compound selected from the group consisting of 2,2-bis(4-hydroxyphenyl)propane (bisphenol A), 2,2-bis(3,5-dichloro-4-hydroxyphenyl)propane (tetrachloro bisphenol A), 2,2-bis(3,5-dibromo-4-hydroxyphenyl)propane (tetrabromo bisphenol A), bis(4-hydroxyphenyl)methane (bisphenol F), 1,1-bis(4-hydroxyphenyl)ethane (bisphenol ACP), bis(4-hydroxyphenyl)sulfone (bisphenol S), 2,2-bis(4-hydroxycyclohexyl)propane (hydrogenated bisphenol A), 1,5-dihydroxynapthalene, 2,2',6,6'-tetramethyl-4,4'-dihydroxybiphenyl, and combinations thereof A specific dihydroxy aromatic compound is 2,2-bis(4-hydroxyphenyl)propane (bisphenol A).

In some embodiments, residue A of the poly(hydroxy ether) block is derived from a dihydroxy compound selected from the group consisting of 1,4-butanediol, 1,6-hexanediol, neopentylglycol, 2,2-bis(4-hydroxy-cyclohexyl)propane, polyethylene glycol, polypropylene glycol, or the like.

In some embodiments, residue B is derived from an epihalohydrin selected from the group consisting of epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and combinations thereof A specific epihalohydrin is epichlorohydrin.

In some embodiments, the mole ratio of poly(hydroxy ether) blocks to poly(phenylene ether) blocks is 0.95:1 to 1.00:1. The lower limit of the mole ratio of poly(hydroxy ether) blocks to poly(phenylene ether) blocks can also be 0.96:1, specifically 0.97:1, more specifically 0.98:1, and still more specifically 0.99:1. The upper limit of the mole ratio of poly(hydroxy ether) blocks to poly(phenylene ether) blocks can also be 0.99:1, specifically 0.98:1, more specifically 0.97:1, and still more specifically 0.96:1. By maintaining the mole ratio of poly(hydroxy ether) blocks to poly(phenylene ether) blocks in these ranges, the molecular weight of the block copolymer is maximized, and epoxy end groups are substantially avoided. Thus, the poly(phenylene ether)-poly(hydroxy ether) block copolymer has melt stability.

In some embodiments, the poly(phenylene ether)-poly(hydroxy ether) block copolymer comprises the at least one poly(hydroxy ether block) in an amount of about 1 to about 99 weight percent, specifically about 10 to about 90 weight percent, more specifically about 20 to about 80 weight percent, still more specifically about 30 to about 70 weight percent, and even more specifically about 40 to about 60 weight percent, based on the weight of the poly(phenylene ether)-poly(hydroxy ether) block copolymer; and the poly (phenylene ether)-poly(hydroxy ether) block copolymer comprises the at least one poly(phenylene ether) block in an amount of about 1 to about 99 weight percent, specifically about 10 to about 90 weight percent, more specifically about 20 to about 80 weight percent, still more specifically about 30 to about 70 weight percent, and even more specifically about 40 to about 60 weight percent, based on the weight of the poly(phenylene ether)-poly(hydroxy ether) block copolymer.

In some embodiments, the number average molecular weight of the poly(phenylene ether)-poly(hydroxy ether) block copolymer as measured by gel permeation chromatography (GPC) against polystyrene standards is about 5,000 to about 50,000 atomic mass units, specifically about 5,500 to about 30,000 atomic mass units, more specifically about 5,000 to about 30,000 atomic mass units, still more specifically about 5,500 to about 20,000 atomic mass units, and even more specifically, about 5,500 to about 10,000 atomic mass units.

In some embodiments, the amount of terminal epoxy groups (i.e., the weight percent of terminal glycidyl groups) in the poly(phenylene ether)-poly(hydroxy ether) block copolymer is less than about 0.09 weight percent, specifically less than about 0.05 weight percent, more specifically less than about 0.025 weight percent, still more specifically less than about 0.01 weight percent, and even more specifically less than about 0.005 weight percent, all based on the weight of the poly(phenylene ether)-poly(hydroxy ether) block copolymer. The amount of terminal epoxy groups can be measured by proton nuclear magnetic resonance ($^1$H-NMR) spectroscopy. When the terminal epoxy group content is less than about 0.09 weight percent, the poly(phenylene ether)-poly(hydroxy ether) block copolymer has thermal stability and is suitable for thermal forming processes such as extruding, calendering, injection molding, and blow molding.

The poly(phenylene ether)-poly(hydroxy ether) block copolymer can be prepared by a method comprising reacting a telechelic poly(phenylene ether) having terminal hydroxyl groups with a telechelic poly(hydroxy ether) epoxy resin having terminal epoxy groups, wherein the mole ratio of the telechelic poly(hydroxy ether) to the telechelic poly(phenylene ether) is 0.95:1 to 1.00:1. The reaction can be conducted in the presence of a solvent selected from aromatic hydrocarbons, chlorinated hydrocarbons, and polar aprotic solvents. Suitable polar aprotic solvents include ketones, esters, ethers, amides, nitriles, sulfoxides, sulfones, and mixtures thereof. In some embodiments, the solvent is cyclohexanone. One embodiment is a poly(phenylene ether)-poly(hydroxy ether) block copolymer prepared by such a method.

The reaction can be conducted in the presence of tertiary amine catalyst that is non-volatile under the reaction conditions. Examples of suitable tertiary amine catalysts are triethylamine, tri-n-propylamine, tri-n-butylamine, dimethylaniline, diethylaniline, alpha-methylbenzyldimethylamine, N,N-dimethylaminoethanol, N,N-dimethylaminopyridine (DMAP), alkylimidazoles, and the like, and mixtures thereof A specific tertiary amine catalyst is N,N-dimethylaminopyridine (DMAP).

In some embodiments, the telechelic poly(hydroxy ether) epoxy resin is added to the telechelic poly(phenylene ether) so that there is always an excess of phenolic groups over epoxy groups in the reaction mixture. The epoxy resin can be added in portions over about 15 to about 300 minutes, specifically about 30 to about 270 minutes, more specifically about 45 to about 240 minutes, still more specifically about 60 to about 210 minutes, and even more specifically about 90 to about 180 minutes. After addition of the epoxy resin to the poly(phenylene ether) is complete, the mixture can be stirred for about 1 to about 12 hours at the reaction temperature. The reaction can be conducted at a temperature of about 100 to about 200° C., specifically, about 120 to about 180° C., more specifically, about 130 to about 170° C., and still more specifically, about 140 to about 160° C.

Upon completion of the reaction, the reaction mixture can be cooled and diluted with a co-solvent selected from aromatic hydrocarbons, chlorinated hydrocarbons, and polar aprotic solvents. In some embodiments, the co-solvent is 2-butanone. After dilution of the reaction mixture with the co-solvent, an anti-solvent is added to effect precipitation of the poly(phenylene ether)-poly(hydroxy ether) block copolymer. The co-solvent can be an alcohol. Suitable alcohols include methanol and isopropanol. After precipitation, the product can be filtered, washed with anti-solvent, and dried under vacuum to afford the poly(phenylene ether)-poly(hydroxy ether) block copolymer.

The poly(phenylene ether)-poly(hydroxy ether) block copolymer has advantageous physical properties which makes it useful as a component of a molding composition. These physical properties are improved over phenoxy resins. The poly(phenylene ether)-poly(hydroxy ether) block copolymer has a density of about 1.1 to about 1.2 grams per cubic centimeter, as measured at 23° C. according to ASTM D792-08, compared to a density of 1.1774 grams per cubic centimeter for phenoxy resin; a glass transition temperature ($T_g$) of about 100 to about 170° C. as measured by differential scanning calorimetry according to ASTM D3418-08, compared to a $T_g$ of 90° C. for phenoxy resin; a heat distortion temperature (HDT) of about 90 to about 140° C. as measured according to ASTM D648-07, Method B at a load of 1.82 megapascals, compared to a HDT of 77° C. for phenoxy resin; a flexural modulus of about 2900 to about 3300 megapascals as measured according to ASTM D790-10, Method A, at 23° C. and a speed of 6.4 millimeters per minute, compared to a flexural modulus of 2761 megapascals for phenoxy resin.

As set forth above, the poly(phenylene ether)-poly(hydroxy ether) block copolymer has a mole ratio of poly(hydroxy ether) blocks to poly(phenylene ether) blocks is 0.95:1 to 1.00:1. This results in a poly(phenylene ether)-poly(hydroxy ether) block copolymer having less than about 0.09 weight percent of terminal epoxy groups. This is a particularly advantageous feature because the poly(phenylene ether)-poly(hydroxy ether) block copolymer has good melt stability. The poly(phenylene ether)-poly(hydroxy ether) block copolymer can be melt-blended or melt-kneaded, and articles can be formed from the composition by extruding, calendering, or molding. This is in marked contrast to poly (phenylene ether)-poly(hydroxy ether) block copolymers having greater than 0.09 weight percent terminal epoxy groups. These block copolymers are subject to cross-linking reactions between the terminal epoxy groups and hydroxyl groups of the poly(phenylene ether)-poly(hydroxy ether) block copolymer in the melt. Thus they are thermoset, not thermoplastic, materials. Therefore, poly(phenylene ether)-poly(hydroxy ether) block copolymers having greater than 0.09 weight percent terminal epoxy groups cannot be melt-blended or melt-kneaded, and articles cannot be formed from poly(phenylene ether)-poly(hydroxy ether) block copolymers having greater than 0.09 weight percent terminal epoxy groups by extruding, calendering, or injection molding. Examples of articles that can be formed from the composition include toys, displays, and housings for consumer electronics and office equipment. When the non-polar polymer comprises a syndiotactic polystyrene, the composition has exceptional heat resistance and is useful for automotive under-the-hood components and specialty electronic applications.

The composition comprises the poly(phenylene ether)-poly(hydroxy ether) block copolymer in an amount of about 2 to about 20 weight percent, based on the total weight of the composition. Within this range, the poly(phenylene ether)-poly(hydroxy ether) block copolymer amount can be about 4 to about 12 weight percent, specifically about 6 to about 12 weight percent.

The composition can, optionally, further comprise one or more additives known in the thermoplastics art. For example, the composition can, optionally, further comprise an additive chosen from stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and the like, and combinations thereof. When present, such additives are typically used in a total amount of less than or equal to 5 weight percent, based on the total weight of the composition.

The composition can, optionally, exclude polymers not described herein as required or optional. For example, the composition can exclude one or more of polyamides, polyesters, and polyolefins.

In a very specific embodiment, the composition comprises about 35 to about 90 weight percent of a poly(alkenyl aromatic); about 5 to about 45 weight percent of glass fibers; and about 4 to about 20 weight percent of a poly(phenylene ether)-poly(hydroxy ether) block copolymer comprising at least one poly(hydroxy ether) block, and at least one poly (phenylene ether) block; wherein the mole ratio of poly(hydroxy ether) blocks to poly(phenylene ether) blocks is 0.95:1 to 1.00:1; wherein the at least one poly(phenylene ether) block has the structure

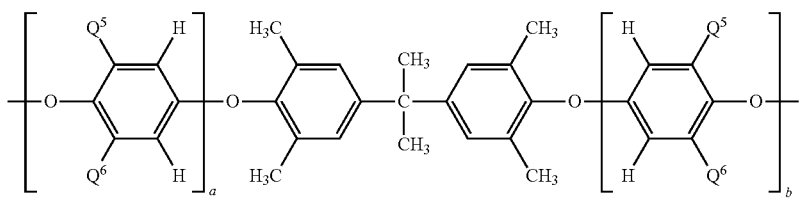

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

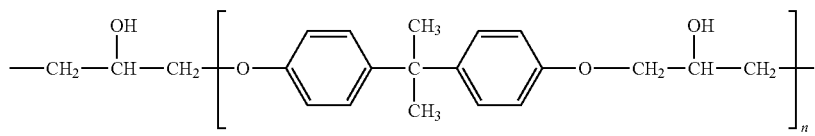

wherein n is about 1 to about 60; wherein all weight percents are based on the total weight of the composition, unless a different weight basis is specified. Within the range of about 35 to about 90 weight percent, the poly(alkenyl aromatic) amount can be about 50 to about 80 weight percent, specifically about 60 to about 75 weight percent. Within the range of about 5 to about 45 weight percent, the glass fibers amount can be about 10 to about 40 weight percent, specifically about 15 to about 30 weight percent. Within the range of about 4 to about 20 weight percent, the poly(phenylene ether)-poly(hydroxy ether) block copolymer amount can be about 5 to about 15 weight percent, specifically about 6 to about 12 weight percent.

In another very specific embodiment, the composition comprises about 35 to about 90 weight percent of a poly (phenylene ether); about 5 to about 45 weight percent of glass fibers; and about 4 to about 20 weight percent of a poly (phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein the at least one poly (phenylene ether) block has the structure

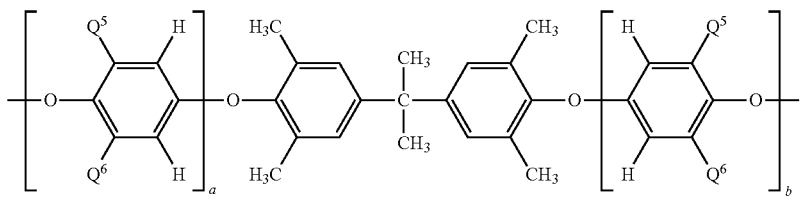

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

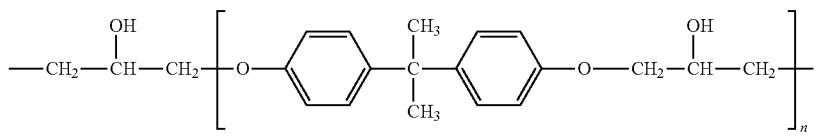

wherein n is about 1 to about 60; wherein all weight percents are based on the total weight of the composition, unless a different weight basis is specified. Within the range of about 35 to about 90 weight percent, the poly(phenylene ether) amount can be about 50 to about 80 weight percent, specifically about 60 to about 75 weight percent. Within the range of about 5 to about 45 weight percent, the glass fibers amount can be about 10 to about 40 weight percent, specifically about 15 to about 30 weight percent. Within the range of about 4 to about 20 weight percent, the poly(phenylene ether)-poly(hydroxy ether) block copolymer amount can be about 5 to about 15 weight percent, specifically about 6 to about 12 weight percent. The composition can, optionally, further comprise about 5 to about 55 weight percent of an additional non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, and combinations thereof. Within the range of about 5 to about 55 weight percent, the additional non-polar polymer amount can be about 10 to about 50 weight percent, specifically about 15 to about 45 weight percent, more specifically about 20 to about 40 weight percent.

Another embodiment is a method of forming a composition, the method comprising: blending about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and about 2 to about 20 weight percent of a poly(phenylene ether)-poly(hydroxy ether) block copolymer comprising at least one poly(hydroxy ether) block, and at least one poly(phenylene ether) block, wherein the mole ratio of poly(hydroxy ether) blocks to poly(phenylene ether) blocks is 0.95:1 to 1.00:1 to form a composition; wherein all weight percents are based on the total weight of the composition, unless a different weight basis is specified.

The invention includes at least the following embodiments.

Embodiment 1

A composition comprising: about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein all weight percents are based on the total weight of the composition, unless a different weight basis is specified.

Embodiment 2

The composition of embodiment 1, wherein the poly(phenylene ether)-poly(hydroxy ether) block copolymer has a number average molecular weight of about 5,000 to about 50,000 atomic mass units.

Embodiment 3

The composition of embodiment 1 or 2, wherein the at least one poly(phenylene ether) block has the structure

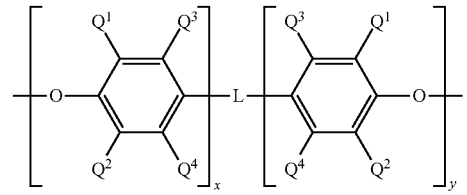

wherein $Q^1$ and $Q^2$ are selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, provided that the sum of x and y is at least 2; and L has the structure

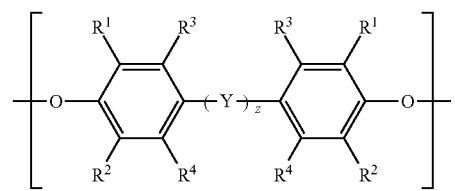

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

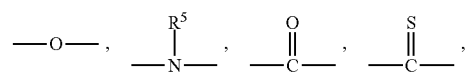

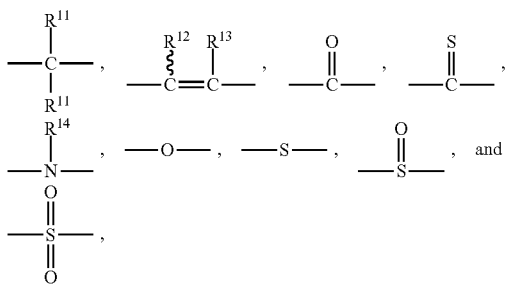
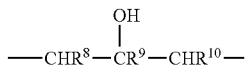

wherein each occurrence of $R^{11}$-$R^{14}$ is independently hydrogen or $C_1$-$C_{12}$ hydrocarbyl, s is 0 or 1, and t and u are each independently 1 to 10; and wherein B is a residue of structure $$—CHR^8—CR^9—CHR^{10}—$$
$$\phantom{—CHR^8—C}|\phantom{R^9—CHR^{10}—}$$
$$\phantom{—CHR^8—}OH\phantom{—CHR^{10}}$$

wherein $R^8$ to $R^{10}$ are each independently hydrogen, or $C_1$-$C_{12}$ hydrocarbyl; and wherein n is about 1 to about 60.

Embodiment 4

The composition of any of embodiments 1-3, wherein the at least one poly(phenylene ether) block has the structure

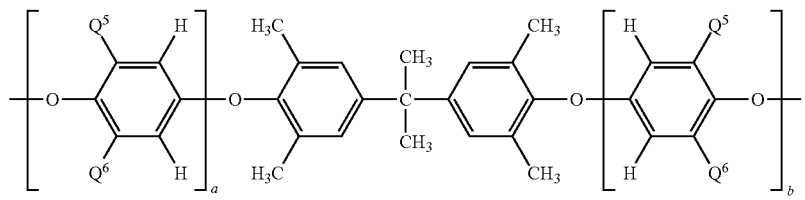

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

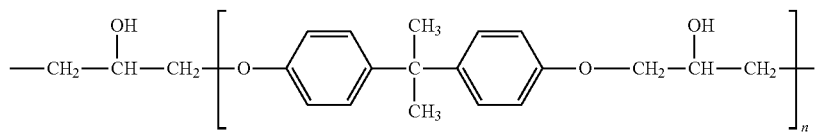

wherein n is about 1 to about 60.

Embodiment 5

The composition of any of embodiments 1-4, wherein the non-polar polymer is selected from the group consisting of poly(alkenyl aromatic)s, and combinations of poly(alkenyl aromatic)s with one or more of unhydrogenated block copolymers of alkenyl aromatic compounds and conjugated dienes, hydrogenated block copolymers of alkenyl aromatic compounds and conjugated dienes, and poly(phenylene ether)s.

Embodiment 6

The composition of embodiment 5, wherein the poly(alkenyl aromatic) is selected from the group consisting of atactic homopolystyrenes, syndiotactic homopolystyrenes, rubber-modified polystyrenes, and combinations thereof.

Embodiment 7

The composition of embodiment 5, wherein the poly(alkenyl aromatic) is an atactic homopolystyrene.

Embodiment 8

The composition of embodiment 5, wherein the poly(alkenyl aromatic) is a syndiotactic homopolystyrene.

Embodiment 9

The composition of any of embodiments 1-4, wherein the non-polar polymer is selected from the group consisting of poly(phenylene ether)s, and combinations of poly(phenylene ether)s with one or more of unhydrogenated block copolymers of alkenyl aromatic compounds and conjugated dienes, hydrogenated block copolymers of alkenyl aromatic compounds and conjugated dienes, and poly(alkenyl aromatic)s.

Embodiment 10

The composition of any of embodiments 1-4, wherein the non-polar polymer is selected from the group consisting of combinations of poly(phenylene ether)s and poly(alkenyl aromatic)s, optionally in further combination with one or more of unhydrogenated block copolymers of alkenyl aromatic compounds and conjugated dienes, and hydrogenated block copolymers of alkenyl aromatic compounds and conjugated dienes.

Embodiment 11

The composition of any of embodiments 1-4, wherein the non-polar polymer is selected from the group consisting of combinations of poly(phenylene ether)s and hydrogenated block copolymers of alkenyl aromatic compounds and conjugated dienes, optionally in further combination with one or more of unhydrogenated block copolymers of alkenyl aromatic compounds and conjugated dienes, and poly(alkenyl aromatic)s.

Embodiment 12

The composition of any of embodiments 1-4, wherein the non-polar polymer is selected from the group consisting of combinations of poly(phenylene ether)s and unhydrogenated block copolymers of alkenyl aromatic compounds and conjugated dienes, optionally in further combination with one or more of hydrogenated block copolymers of alkenyl aromatic compounds and conjugated dienes, and poly(alkenyl aromatic)s.

Embodiment 13

The composition of any of embodiments 1-12, wherein the polar filler is selected from the group consisting of glass fibers and combinations of glass fibers with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers.

Embodiment 14

The composition of any of embodiments 1-12, wherein the polar filler is selected from the group consisting of clays, talcs, micas, and combinations thereof, optionally in further combination with one or more of glass fibers, glass flakes, glass beads, silicas, aluminas, titanium dioxides, wollastonites, calcium carbonates, calcium sulfates, barium sulfates, dolomites, processed mineral fibers, metal oxides, metal hydroxides, and ceramic fibers.

Embodiment 15

The composition of any of embodiments 1-12, wherein the polar filler is surface-treated polar filler that is the product of a process comprising treating a polar filler with a surface treatment agent selected from the group consisting of γ-aminopropyltrialkoxysilanes, γ-(meth)acryloxypropyltrialkoxysilanes, β-(3,4-epoxycyclohexyl)ethyltrialkoxysiloxanes, and combinations thereof.

Embodiment 16

A composition comprising: about 35 to about 90 weight percent of a poly(alkenyl aromatic); about 5 to about 45 weight percent of glass fibers; and about 5 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein the at least one poly(phenylene ether) block has the structure

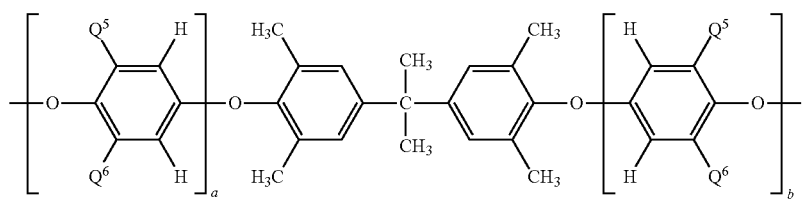

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

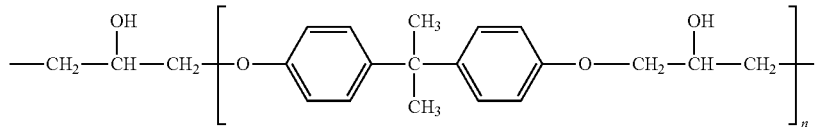

wherein n is about 1 to about 60; wherein all weight percents are based on the total weight of the composition, unless a different weight basis is specified.

Embodiment 17

A composition comprising: about 35 to about 90 weight percent of a poly(phenylene ether); about 5 to about 45 weight percent of glass fibers; and about 5 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein the at least one poly(phenylene ether) block has the structure

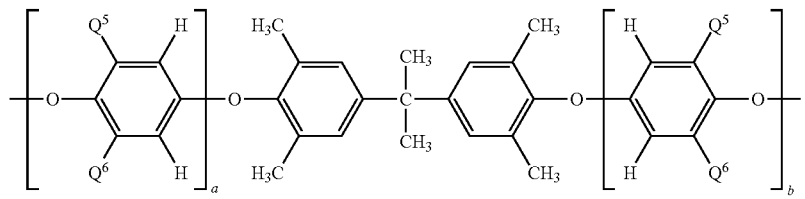

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

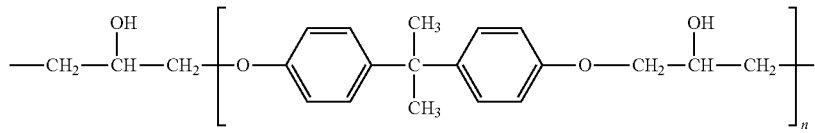

wherein n is about 1 to about 60; wherein all weight percents are based on the total weight of the composition, unless a different weight basis is specified.

Embodiment 18

The composition of embodiment 17, further comprising about 5 to about 55 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, and combinations thereof.

Embodiment 19

An article comprising the composition of any of embodiments 1-18.

Embodiment 20

A method of forming a composition, comprising: blending about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof, about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof, and about 2 to about 20 weight percent of a poly(phenylene ether)-poly(hydroxy ether) block copolymer comprising at least one poly(hydroxy ether) block, and at least one poly (phenylene ether) block, wherein the mole ratio of poly(hydroxy ether) blocks to poly(phenylene ether) blocks is 0.95:1 to 1.00:1 to form a composition; wherein all weight percents are based on the total weight of the composition, unless a different weight basis is specified.

The invention is further illustrated by the following non-limiting examples.

PREPARATIVE EXAMPLES

Individual components used in the preparative examples are summarized in Table 1.

TABLE 1

| Component | Description |
|---|---|
| PPE-2OH 0.06 IV | Copolymer of 2,6-dimethylphenol and 2,2-bis(3,5-dimethyl-4-hydroxyphenyl)propane, CAS Reg. No. 1012321-47-9, having an average of about 1.9 hydroxyl groups per molecule, an intrinsic viscosity of 0.06 deciliter per gram measured in chloroform at 25° C., and a hydroxyl equivalent weight of about 630 grams per equivalent, prepared according to the procedure of Example 4 in U.S. Pat. No. 7,671,167 B2 to Carrillo et al. |
| PPE-2OH 0.09 IV | Copolymer of 2,6-dimethylphenol and 2,2-bis(3,5-dimethyl-4-hydroxyphenyl)propane, CAS Reg. No. 1012321-47-9, having an average of about 1.9 hydroxyl groups per molecule, a hydroxyl equivalent weight of about 780 grams per equivalent, and an intrinsic viscosity of about 0.09 deciliter per gram as measured at 25° C. in chloroform; obtained as SA90 from SABIC Innovative Plastics. |
| PPE-2OH 0.12 IV | Copolymer of 2,6-dimethylphenol and 2,2-bis(3,5-dimethyl-4-hydroxyphenyl)propane, CAS Reg. No. 1012321-47-9, having an average of about 1.9 hydroxyl groups per molecule, an intrinsic viscosity of 0.12 deciliter per gram measured in chloroform at 25° C., and a hydroxyl equivalent weight of 1700 grams per equivalent, prepared according to the procedure of Example 1 in U.S. Pat. No. 7,671,167 B2 to Carrillo et al. |
| DER 317 | 2,2-Bis(4-hydroxyphenyl)propane-epichlorohydrin polymer, a high viscosity liquid epoxy resin having an epoxide equivalent weight of 199.3 grams per equivalent; obtained as DER 317 from Dow Chemical. |
| DER 667-E | 2,2-Bis(4-hydroxyphenyl)propane-epichlorohydrin polymer, a high molecular weight Type 7 solid epoxy resin having an epoxide equivalent weight of 1744 grams per equivalent; obtained as DER 667-E from Dow Chemical. |
| DER 668-20 | 2,2-Bis(4-hydroxyphenyl)propane-epichlorohydrin polymer, a high molecular weight Type 8 solid epoxy resin having an epoxide equivalent weight of 2500 grams per equivalent; obtained as DER 668-20 from Dow Chemical. |
| DER 6155 | 2,2-Bis(4-hydroxyphenyl)propane-epichlorohydrin polymer, a high molecular weight Type 5 solid epoxy resin having an epoxide equivalent weight of 1365 grams per equivalent obtained as DER 6155 from Dow Chemical. |
| EPON 1001F | 2,2-Bis(4-hydroxyphenyl)propane-epichlorohydrin polymer, a solid epoxy resin having an epoxide equivalent weight of 528 grams per equivalent obtained as EPON 1001F from Momentive Specialty Chemicals. |
| EPON 1002F | 2,2-Bis(4-hydroxyphenyl)propane-epichlorohydrin polymer, a solid epoxy resin having an epoxide equivalent weight of 663 grams per equivalent; obtained as EPON 1002F from Momentive Specialty Chemicals. |
| EPON 1004F | 2,2-Bis(4-hydroxyphenyl)propane-epichlorohydrin polymer, a solid epoxy resin having an epoxide equivalent weight of 853 grams per equivalent; obtained as EPON 1004F from Momentive Specialty Chemicals. |
| EPON 1007F | 2,2-Bis(4-hydroxyphenyl)propane-epichlorohydrin polymer, a solid epoxy resin having an epoxide equivalent weight of 1810 grams per equivalent obtained as EPON 1007F from Momentive Specialty Chemicals. |

Preparative Example 1

Poly(Phenylene Ether)-Poly(Hydroxy Ether) Block Copolymer with 24 Weight Percent Poly(Phenylene Ether) Blocks

TABLE 2

Reactant Amounts

| Reactant | HEW[1] (grams/equivalent) | EEW[2] (grams/equivalent) | Amount (grams) | Amount equivalents |
|---|---|---|---|---|
| PPE-2OH 0.09 IV | 778 | — | 118.67 | 0.15253 |
| DER 668-20 | — | 2500 | 381.33 | 0.15253 |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of N,N-dimethylaminopyridine (DMAP) was added and dissolved. The DER 668-20 polymer was added in portions over 90 minutes as follows.

| Time (minutes) | Amount Added (weight %) |
|---|---|
| 0 | 73 |
| 30 | 23 |
| 60 | 3.5 |
| 90 | 0.5 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 465 grams (93%).

Preparative Example 2

Poly(Phenylene Ether)-Poly(Hydroxy Ether) Block Copolymer with 30 Weight Percent Poly(Phenylene Ether) Blocks

TABLE 3

Reactant Amounts

| Reactant | HEW[1] (grams/ equiv) | EEW[2] (grams/ equiv) | Amount (grams) | Amount (equiv) | Ratio Epoxy to PPE |
|---|---|---|---|---|---|
| PPE-2OH 0.09 IV | 778 | — | 150.31 | 0.1932 | 1.000:1 |
| EPON 1007F | — | 1810 | 349.69 | 0.1932 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1007F polymer was added in portions over 90 minutes as follows.

| Time (minutes) | Amount Added (weight %) |
|---|---|
| 0 | 63 |
| 30 | 32 |
| 60 | 4 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 462 grams (92.4%).

Preparative Example 3

Poly(Phenylene Ether)-Poly(Hydroxy Ether) Block Copolymer with 36 Weight Percent Poly(Phenylene Ether) Blocks

TABLE 4

Reactant Amounts

| Reactant | HEW[1] (grams/ equiv) | EEW[2] (grams/ equiv) | Amount (grams) | Amount (equiv) | Ratio Epoxy to PPE |
|---|---|---|---|---|---|
| PPE-2OH 0.09 IV | 778 | — | 181.52 | 0.2333 | 1.000:1 |
| DER 6155 | — | 1365 | 318.47 | 0.2333 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The DER 6155 polymer was added in portions over 90 minutes as follows.

| Time (minutes) | Amount Added (weight %) |
|---|---|
| 0 | 63 |
| 30 | 31 |
| 60 | 5 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 455 grams (91%).

Preparative Example 4

Poly(Phenylene Ether)-Poly(Hydroxy Ether) Block Copolymer with 54 Weight Percent Poly(Phenylene Ether) Blocks

TABLE 5

Reactant Amounts

| Reactant | HEW[1] (grams/ equiv) | EEW[2] (grams/ equiv) | Amount (grams) | Amount (equiv) | Ratio Epoxy to PPE |
|---|---|---|---|---|---|
| PPE-2OH 0.09 IV | 778 | — | 269.99 | 0.3470 | 0.9997:1 |
| EPON 1002F | — | 663 | 230.03 | 0.3469 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1002F polymer was added in portions over 90 minutes as follows.

| Time (minutes) | Amount Added (Weight %) |
|---|---|
| 0 | 70 |
| 30 | 25 |
| 60 | 4 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 460 grams (92%).

Preparative Example 5

Poly(Phenylene Ether)-Poly(Hydroxy Ether) Block Copolymer with 60 Weight Percent Poly(Phenylene Ether) Blocks

TABLE 6

| | Reactant Amounts | | | | |
| --- | --- | --- | --- | --- | --- |
| Reactant | HEW[1] (grams/ equiv) | EEW[2] (grams/ equiv) | Amount (grams) | Amount (equiv) | Ratio Epoxy to PPE |
| PPE-2OH 0.09 IV | 778 | — | 297.86 | 0.3829 | 1.000:1 |
| EPON 1001F | — | 528 | 202.14 | 0.3829 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1001F polymer was added in portions over 90 minutes as follows.

| Time (minutes) | Amount Added (Weight %) |
| --- | --- |
| 0 | 62 |
| 30 | 25 |
| 60 | 12 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 471 grams (94.2%).

Preparative Example 6

Poly(Phenylene Ether)-Poly(Hydroxy Ether) Block Copolymer with 80 Weight Percent Poly(Phenylene Ether) Blocks

TABLE 7

| | Reactant Amounts | | | | |
| --- | --- | --- | --- | --- | --- |
| Reactant | HEW[1] (grams/ equiv) | EEW[2] (grams/ equiv) | Amount (grams) | Amount (equiv) | Ratio Epoxy to PPE |
| PPE-2OH 0.09 IV | 778 | — | 150.31 | 0.5116 | 1.000:1 |
| DER 317 | — | 199.3 | 199.3 | 0.5116 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The DER 317 polymer was added in portions over 90 minutes as follows.

| Time (minutes) | Amount Added (Weight %) |
| --- | --- |
| 0 | 67 |
| 30 | 26 |
| 60 | 6 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 466 grams (93.2%).

Preparative Example 7

Poly(Phenylene Ether)-Poly(Hydroxy Ether) Block Copolymer with 46.5 Weight Percent Poly(Phenylene Ether) Blocks

TABLE 8

| | Reactant Amounts | | | | |
| --- | --- | --- | --- | --- | --- |
| Reactant | HEW[1] (grams/ equiv) | EEW[2] (grams/ equiv) | Amount (grams) | Amount (equiv) | Ratio Epoxy to PPE |
| PPE-2OH 0.12 IV | 1691 | — | 123.07 | 0.07278 | 1.000:1 |
| DER 667-E | — | 1744 | 126.93 | 0.07278 | |

[1]Hydroxyl equivalent weight.
[2]Epoxide equivalent weight.

Into a 1 liter three-necked round bottom flask equipped with a mechanical stirrer, thermocouple probe, powder funnel, and heating mantel, was added 250 milliliters cyclohexanone. The cyclohexanone was heated to 150° C. with stirring. The poly(phenylene ether) was added and dissolved. Then 2.5 grams (0.0205 moles) of DMAP was added and dissolved. The DER 667-E polymer was added in portions over 120 minutes as follows.

| Time (minutes) | Amount Added (Weight %) |
| --- | --- |
| 0 | 85.9 |
| 30 | 8.7 |
| 60 | 5.2 |
| 90 | 0.15 |
| 120 | 0.06 |

The solution was stirred for 7 hours at 150° C. The reaction mixture was cooled below 80° C. and diluted with 200 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 237 grams (94.8%).

Preparative Example 8

Poly(Phenylene Ether)—Poly(Hydroxy Ether) Block Copolymer with 48.6 Weight Percent Poly(Phenylene Ether) Blocks

TABLE 9

| | Reactant Amounts | | | | |
|---|---|---|---|---|---|
| Reactant | HEW[1] (grams/ equiv) | EEW[2] (grams/ equiv) | Amount (grams) | Amount (equiv) | Ratio Epoxy to PPE |
| PPE-2OH 0.06 IV | 627 | — | 121.5116 | 0.1938 | 1.000:1 |
| EPON 1002F | — | 663 | 128.4884 | 0.1938 | |

[1]Hydroxyl equivalent weight.
[2]Epoxide equivalent weight.

Into a 1 liter three-necked round bottom flask equipped with a mechanical stirrer, thermocouple probe, powder funnel, and heating mantel, was added 250 milliliters cyclohexanone. The cyclohexanone was heated to 150° C. with stirring. The hydroxy-bifunctional poly(phenylene ether) was added and dissolved. Then 2.5 grams (0.0205 moles) of DMAP was added and dissolved. The EPON 1002F polymer was added in portions over 120 minutes as follows.

| Time (minutes) | Amount Added (Weight %) |
|---|---|
| 0 | 89.5 |
| 30 | 7 |
| 60 | 3.3 |
| 90 | 0.1 |
| 120 | 0.1 |

The solution was stirred for 7 hours at 150° C. The reaction mixture was cooled below 80° C. and diluted with 200 milliliters 2-butanone. The resultant poly(phenylene ether)-poly (hydroxy ether) block copolymer was isolated by precipitation in methanol, filtered, washed with methanol, and dried in a vacuum oven at 100° C. The yield was 226 grams (90.4%).

Preparative Example 9

Poly(Phenylene Ether)-Poly(Hydroxy Ether) Block Copolymer with 48 Weight Percent Poly(Phenylene Ether) Blocks

TABLE 10

| | Reactant Amounts | | | | |
|---|---|---|---|---|---|
| Reactant | HEW[1] (grams/ equiv) | EEW[2] (grams/ equiv) | Amount (grams) | Amount (equiv) | Ratio Epoxy to PPE |
| PPE-2OH 0.09 IV | 778 | — | 238.60 | 0.3067 | 0.9993:1 |
| EPON 1004F | — | 853 | 261.40 | 0.3065 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1004F polymer was added in portions over 90 minutes as follows.

| Time (minutes) | Amount Added (Weight %) |
|---|---|
| 0 | 77 |
| 30 | 22 |
| 60 | 0.75 |
| 90 | 0.25 |

The solution was stirred for 7 hours at 150° C. The reaction mixture was cooled below 80° C. and diluted with 400 milliliters 2-butanone. The resultant poly(phenylene ether)-poly (hydroxy ether) block copolymer was isolated by precipitation in methanol, filtered, washed with methanol, and dried in a vacuum oven at 100° C. The yield was 471 grams (94%).

Characterization of Poly(Phenylene Ether)-Poly(Hydroxy Ether) Block Copolymers

Various properties of the poly(phenylene ether)-poly(hydroxy ether) block copolymers of Preparative Examples 1-9 were determined. Glass transition temperature ($T_g$) was measured by differential scanning calorimetry (DSC) according to ASTM D3418-08. Number average molecular weight ($M_n$), weight average molecular weight ($M_w$), and polydispersity ($M_w/M_n$) were determined by gel permeation chromatography (GPC) using polystyrene standards. Density was measured at 23° C. according to ASTM D792-08. Flexural modulus and flexural stress at break (both expressed in megapascals) were measured at 23° C. according to ASTM D790-10, Method B, using samples having a depth of 3.2 millimeters and a width of 12.7 millimeters, a support span length of 10 centimeters (3.937 inches), and a crosshead motion rate of 1.35 millimeters/minute (0.053 inch/minute). Heat deflection temperature (expressed in degrees Centigrade), was measured according to ASTM D648-07, Method B, using a load of 1.82 megapascals and injection molded specimens having a width of 3.20 millimeters and a depth of 12.80 millimeters. For heat deflection testing, samples were immersed in silicone oil, which was initially at less than 30° C. Specimens were conditioned for 24 hours at 23° C. before testing.

Terminal epoxy group content was determined by proton nuclear magnetic resonance ($^1$H-NMR) spectroscopy using a Varian Mercury Plus 400 Megahertz $^1$H-NMR spectrometer. The amount of terminal epoxy groups was calculated from the height of the peaks corresponding to protons "a" and "h" in the structures below using the equation:

Weight Percent Terminal Epoxy Groups=$h/(h+a) \times 100$.

The proton peak assignments corresponding to the labeled protons in the chemical structures below are given in Table 11.

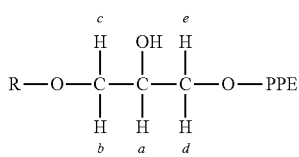

hydroxyether group

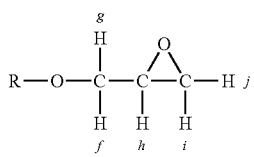

terminal epoxy group

TABLE 11

| | Proton Chemical Shifts |
|---|---|
| Proton | Chemical Shift (parts per million)* |
| a | 4.35 |
| e | 2.74 |
| f | 4.19 |
| g | 3.94 |
| h | 3.34 |
| i | 2.89 |

*Chloroform measured at 7.26 parts per million.

The limit of detection of terminal epoxy groups in this method is <0.05 weight percent. Properties for Preparative Examples 1-8 are summarized in Table 12.

TABLE 12

Chemical and Physical Properties of Poly(phenylene ether)-poly(hydroxy ether) Block Copolymers

| Example | PPE (wt %) | $T_g$ (° C.) | $M_n$ | $M_w$ | $M_n/M_w$ | Epoxy (wt %) | Density (g/cc) | Flex. Modulus (MPa) | Flex. Stress @ Break (MPa) | HDT @ 1.82 MPa (° C.) |
|---|---|---|---|---|---|---|---|---|---|---|
| Prep. Ex. 1 | 24 | 112 | 6456 | 20,720 | 3.21 | <0.05 | — | — | — | — |
| Prep. Ex. 2 | 30 | 117 | 5607 | 24,274 | 4.33 | <0.05 | 1.1565 | 2972 | 89 | 98 |
| Prep. Ex. 3 | 36 | 120 | 6873 | 36,440 | 5.30 | <0.05 | 1.1506 | 2988 | 87 | 101 |
| Prep. Ex. 4 | 54 | 132 | 6527 | 32,698 | 5.01 | <0.05 | 1.1352 | 2905 | 84 | 109 |
| Prep. Ex. 5 | 60 | 141 | 7324 | 41,928 | 5.72 | <0.05 | 1.1291 | 2956 | 80 | 124 |
| Prep. Ex. 6 | 80 | 155 | 6534 | 33,988 | 5.20 | <0.05 | 1.1116 | — | — | — |
| Prep. Ex. 7 | 46.5 | 127 | 6511 | 27,919 | 3.80 | — | — | — | — | — |
| Prep. Ex. 8 | 48.6 | 126 | 5980 | 21,591 | 3.60 | — | — | — | — | — |
| Prep. Ex. 9 | 48 | 125 | 8147 | 30,388 | 3.73 | <0.05 | 1.1408 | — | — | — |

Examples 1-7, Comparative Examples 1 and 2

These examples illustrate the use of poly(phenylene ether)-poly(hydroxy ether) block copolymers as compatibilizing agents for a polar filler (glass fiber) in a non-polar polymer (polystyrene). Materials used in compounding experiments are summarized in Table 13.

TABLE 13

| Component | Description |
|---|---|
| PS | Atactic polystyrene, CAS Reg. No. 9003-53-6, having a melt flow of about 1.5 grams per 10 minutes measured at 200° C. and a 5 kilogram load; obtained as STYRON 685DL from Americas Styrenics LLC. |
| Glass fiber | Chopped glass fiber having a diameter of about 13-14 micrometers, a pre-compounded length of about 3.2 millimeters (⅛ inch), and an aminosilane surface treatment; obtained as E-Glass Chopped Strand T-849 from Nippon Electric Glass Company. |
| PKHH | Phenoxy resin produced by copolymerization of 2,2-bis(4-hydroxyphenyl)propane and 2,2-bis(4-hydroxyphenyl)propane-epichlorohydrin polymer, having a number average molecular weight of 10,000 atomic mass units; obtained as PKHH from InChem Corporation. |
| PPE-PHE 36%, 1500 | Poly(phenylene ether)-poly(hydroxy ether) block copolymer prepared according to the method of Preparative Example 3, having about 36 weight percent poly(phenylene ether) blocks, a poly(phenylene ether) block molecular weight of about 1500 atomic mass units, and a poly(hydroxy ether) block molecular weight of about 2730 atomic mass units, and a calculated hydroxyl group content of 3.83 weight percent. |
| PPE-PHE 48%, 1500 | Poly(phenylene ether)-poly(hydroxy ether) block copolymer prepared according to the method of Preparative Example 9, having about 48 weight percent poly(phenylene ether) blocks, a poly(phenylene ether) block molecular weight of about 1500 atomic mass units, and a |

TABLE 13-continued

| Component | Description |
|---|---|
| | poly(hydroxy ether) block molecular weight of about 1706 atomic mass units, and a calculated hydroxyl group content of 3.11 weight percent. |
| PPE-PHE 60%, 1500 | Poly(phenylene ether)-poly(hydroxy ether) block copolymer prepared according to the method of Preparative Example 5, having about 60 weight percent poly(phenylene ether) blocks, a poly(phenylene ether) block molecular weight of about 1500 atomic mass units, and a poly(hydroxy ether) block molecular weight of about 1056 atomic mass units, and a calculated hydroxyl group content of 2.39 weight percent. |
| PPE-PHE 46.5%, 2750 | Poly(phenylene ether)-poly(hydroxy ether) block copolymer prepared according to the method of Preparative Example 7, having about 46.5 weight percent poly(phenylene ether) blocks, a poly(phenylene ether) block molecular weight of about 2750 atomic mass units, and a poly(hydroxy ether) block molecular weight of about 3488 atomic mass units, and a calculated hydroxyl group content of 3.20 weight percent. |
| PPE-PHE 48.6%, 1150 | Poly(phenylene ether)-poly(hydroxy ether) block copolymer prepared according to the method of Preparative Example 8, having about 48.6 weight percent poly(phenylene ether) blocks, a poly(phenylene ether) block molecular weight of about 1150 atomic mass units, and a poly(hydroxy ether) block molecular weight of about 1326 atomic mass units, and a calculated hydroxyl group content of 3.08 weight percent. |

Compositions were compounded on a Coperion ZSK 18 twin-screw laboratory (18 millimeter screw outer diameter) extruder operating at a screw rotation rate of 300 rotations per minute, a torque of 45-60%, and zone temperatures of 180° C., 230° C., 260° C., 270° C., 270° C., 270° C., and 270° C. from fee throat to die. Articles for physical property testing were injection molded using a Demag Plastic Group Model 40-80 injection molding machine operating at the conditions summarized in Table 14, where the injection pressure values and back pressure values are expressed in units of megapascals.

TABLE 14

| | Zone 1 (° C.) | Zone 2 (° C.) | Zone 3 (° C.) | Nozzle (° C.) | Mold (° C.) | Injection Pressure (MPa) | Back Pressure (MPa) |
|---|---|---|---|---|---|---|---|
| C. Ex. A | 288 | 288 | 288 | 288 | 60 | 8.27 | 0.35 |
| C. Ex. B | 288 | 288 | 288 | 288 | 60 | 5.52 | 0.07 |
| Ex. 1 | 288 | 288 | 288 | 288 | 60 | 8.27 | 0.14 |
| Ex. 2 | 288 | 288 | 288 | 288 | 60 | 8.27 | 0.21 |
| Ex. 3 | 299 | 299 | 299 | 299 | 60 | 8.27 | 0.21 |
| Ex. 4 | 299 | 299 | 299 | 299 | 60 | 8.27 | 0.21 |
| Ex. 5 | 299 | 299 | 299 | 299 | 60 | 8.27 | 0.21 |
| Ex. 6 | 299 | 299 | 299 | 299 | 60 | 8.27 | 0.21 |
| Ex. 7 | 299 | 299 | 299 | 299 | 60 | 8.27 | 0.35 |

Compositions and properties are summarized in Table 15. Values for flexural modulus, flexural stress at yield, and flexural stress at break, all expressed in units of megapascals, were determined according to ASTM D790-07e1, Procedure A, using a temperature of 23° C., bar cross-sectional dimensions of 3.2 millimeters by 12.7 millimeters, a support span of 50.8 millimeters, and a test speed of 1.27 millimeters/minute (0.05 inches/minute). Tensile stress at yield values were determined according to ASTM D638-08 at 23° C. using a Type I bar, a gage length of 50 millimeters, and a test speed of 50 millimeters/minute. Tensile stress at yield values were determined on as-molded test articles, and after 50 and 100 hours immersion of test articles in 80° C. water.

The property results show that Examples 1-7 containing a poly(phenylene ether)-poly(hydroxy ether) block copolymer exhibit substantially greater stiffness (as evidenced by flexural properties), toughness (as evidenced by notched Izod impact strength and tensile stress at yield), and heat resistance (as evidenced by heat deflection temperature), than Comparative Example 1 containing no compatibilizer, and Comparative Example 2 containing a poly(hydroxy ether). The compositions containing a poly(phenylene ether)-poly(hydroxy ether) block copolymer also exhibited greater water resistance as evidenced by tensile stress at yield values determined after 50 and 100 hours immersion in 80° C. water for Examples 1, 3, and 6 relative to Comparative Examples 1 and 2. It is important to note that the advantages provided by the poly(phenylene ether)-poly(hydroxy ether) block copolymer are obtained over and above the advantages provided by the use of glass fibers surface treated with a coupling agent to improve their compatibility with non-polar polymers.

TABLE 15

| | C. Ex. 1 | C. Ex. 2 | Ex. 1 | Ex. 2 | Ex. 3 |
|---|---|---|---|---|---|
| COMPOSITIONS | | | | | |
| PS | 80 | 70 | 70 | 75 | 70 |
| Glass fiber | 20 | 20 | 20 | 20 | 20 |
| PKHH | 0 | 10 | 0 | 0 | 0 |
| PPE-PHE 36%, 1500 | 0 | 0 | 10 | 5 | 0 |
| PPE-PHE 48%, 1500 | 0 | 0 | 0 | 0 | 10 |
| PPE-PHE 60%, 1500 | 0 | 0 | 0 | 0 | 0 |
| PPE-PHE 46.5%, 2750 | 0 | 0 | 0 | 0 | 0 |
| PPE-PHE 48.6%, 1150 | 0 | 0 | 0 | 0 | 0 |
| PROPERTIES | | | | | |
| Flexural Modulus (MPa) | 6440 | 6646 | 6733 | 6735 | 6807 |
| Flexural Stress @ Yield (MPa) | 97.9 | 113.9 | 138.8 | 127.2 | 131.0 |
| Flexural Stress @ Break (MPa) | 98.0 | 113.9 | 136.4 | 128.5 | 131.3 |
| HDT @ 1.82 MPa (° C.) | 98.6 | 96.8 | 101.0 | 101.0 | 103.9 |
| Notched Izod (J/m) | 37.7 | 38.4 | 56.8 | 55.7 | 58.3 |
| Tensile Stress @ Yield (MPa), as molded | 62.2 | 76.7 | 91.8 | 87.6 | 92.5 |
| Tensile Stress @ | 55.1 | 64.4 | 74.7 | — | 73.4 |

TABLE 15-continued

| | Ex. 4 | Ex. 5 | Ex. 6 | Ex. 7 |
|---|---|---|---|---|
| Yield (MPa), after 50 hours immersion in water at 80° C. | | | | |
| Tensile Stress @ Yield (MPa), after 10 hours immersion in water at 80° C. | 54.1 | 61.7 | 68.7 | — | 67.7 |

| | Ex. 4 | Ex. 5 | Ex. 6 | Ex. 7 |
|---|---|---|---|---|
| COMPOSITIONS | | | | |
| PS | 75 | 70 | 70 | 70 |
| Glass fiber | 20 | 20 | 20 | 20 |
| PKHH | 0 | 0 | 0 | 0 |
| PPE-PHE 36%, 1500 | 0 | 0 | 0 | 0 |
| PPE-PHE 48%, 1500 | 0 | 0 | 0 | 0 |
| PPE-PHE 60%, 1500 | 5 | 10 | 0 | 0 |
| PPE-PHE 46.5%, 2750 | 0 | 0 | 10 | 0 |
| PPE-PHE 48.6%, 1150 | 0 | 0 | 0 | 10 |
| PROPERTIES | | | | |
| Flexural Modulus (MPa) | 6798 | 6878 | 6877 | 6607 |
| Flexural Stress @ Yield (MPa) | 122.4 | 124.0 | 138.9 | 110.7 |
| Flexural Stress @ Break (MPa) | 125.1 | 126.5 | 138.9 | 110.7 |
| HDT @ 1.82 MPa (° C.) | 102.7 | 107.1 | 105.1 | 101.8 |
| Notched Izod (J/m) | 56.1 | 58.9 | 67.3 | 44.7 |
| Tensile Stress @ Yield (MPa) | 89.4 | 93.4 | 93.6 | 76.5 |
| Tensile Stress @ Yield (MPa), after 50 hours immersion in water at 80° C. | — | — | 76.8 | — |
| Tensile Stress @ Yield (MPa), after 10 hours immersion in water at 80° C. | — | — | 69.7 | — |

The enhanced physical properties obtained in Examples 1-7 suggest that the poly(phenylene ether)-poly(hydroxy ether) block copolymers are effective in increasing the interfacial adhesion between the polystyrene phase and glass fiber. Therefore, the polystyrene-glass fiber interfaces were examined by Scanning Electronic Microscopy (SEM).

Samples for Scanning Electronic Microscopy (SEM) were cryo-fractured in liquid nitrogen and mounted on SEM stub. Then the samples were coated with gold. The samples were examined using a Carl Zeiss AG-EVO® 40 Series scanning electron microscope. The conditions were SEM mode, a probe current of 40 picoamps, HV (high vacuum), and an acceleration voltage of 20 kilovolts.

FIG. 1 is an electron micrograph of a sample prepared from the Comparative Example 1 composition with no compatibilizer. The glass fiber appears bare and there is no indication of polystyrene adhering to the glass fiber. There is separation between the glass fiber and the polystyrene.

Figure 2:
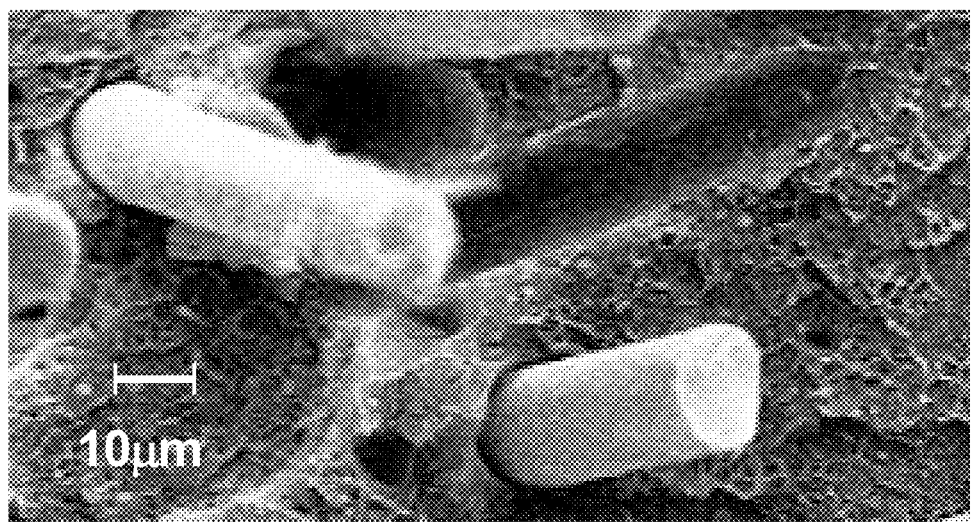
FIG. 2 is an electron micrograph of a sample prepared from the Comparative Example 2 composition with poly(hydroxy ether) compatibilizer. The glass fiber appears to be unattached from the polystyrene/poly(hydroxy ether) matrix.

FIG. 2 is an electron micrograph of a sample prepared from the Comparative Example 2 composition with poly(hydroxy ether) compatibilizer. There is no indication of any strong interaction of the resin with the glass fiber. The glass fiber is unattached from the polystyrene/poly(hydroxy ether) matrix. There appears to be a low level of some resin adhering to the glass fiber which may be the poly(hydroxy ether).

Figure 3:
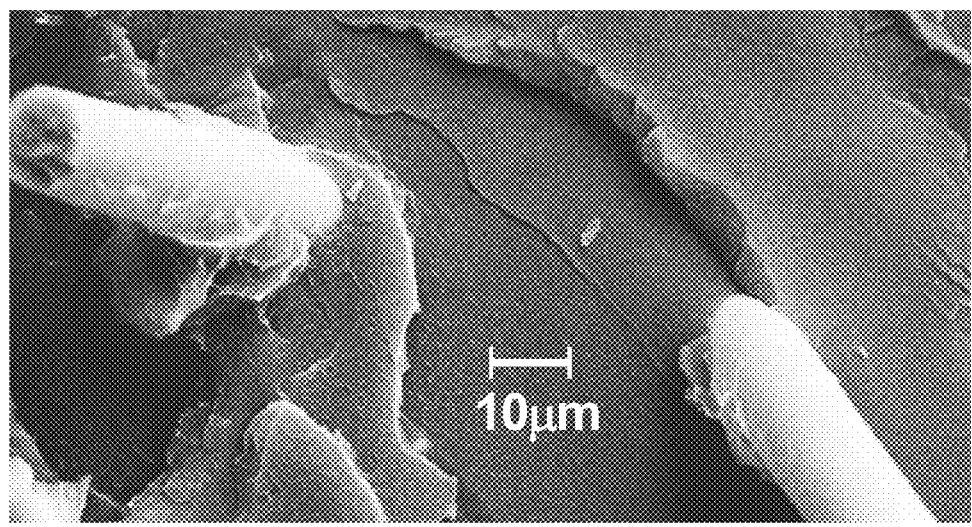
FIG. 3 is an electron micrograph of a sample prepared from the Example 3 composition with poly(phenylene ether)-poly(hydroxy ether) block copolymer compatibilizer. The glass fiber appears to be attached to the polystyrene/poly(phenylene ether)-poly(hydroxy ether) block copolymer matrix.

FIG. 3 is an electron micrograph of a sample prepared from the Example 3 composition with poly(phenylene ether)-poly(hydroxy ether) block copolymer compatibilizer. There is good adhesion between the polystyrene/poly(phenylene ether)-poly(hydroxy ether) block copolymer resin matrix and the glass fiber. There is no indication of any separation of the glass fiber from the resin matrix.

The results of FIGS. 1-3 are therefore consistent with the poly(phenylene ether)-poly(hydroxy ether) block copolymer promoting interfacial adhesion between the non-polar polymer matrix and the polar filler.

The invention claimed is:

1. A composition comprising:
    about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof;
    about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof; and
    about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1;
    wherein all weight percents are based on the total weight of the composition, unless a different weight basis is specified.

2. The composition of claim 1, wherein the poly(phenylene ether)-poly(hydroxy ether) block copolymer has a number average molecular weight of about 5,000 to about 50,000 atomic mass units.

3. The composition of claim 1,
    wherein the at least one poly(phenylene ether) block has the structure

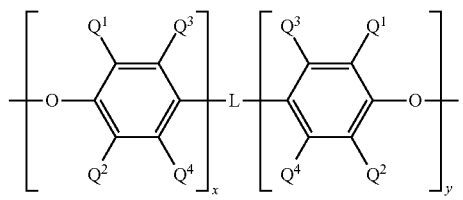

wherein $Q^1$ and $Q^2$ are selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, provided that the sum of x and y is at least 2; and L has the structure

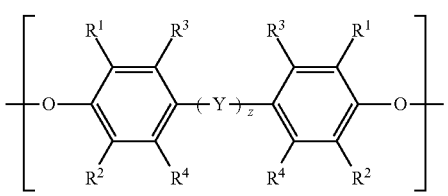

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

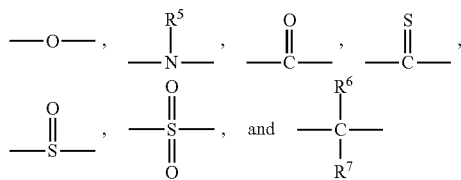

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and
  wherein the at least one poly(hydroxy ether) block has the structure
    —B-[A-B]$_n$— wherein A is a residue of structure

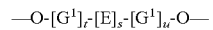

wherein each $G^1$ is independently at each occurrence a $C_6$-$C_{20}$ aromatic radical, and E is independently at each occurrence a direct bond, or a structure selected from the group consisting of

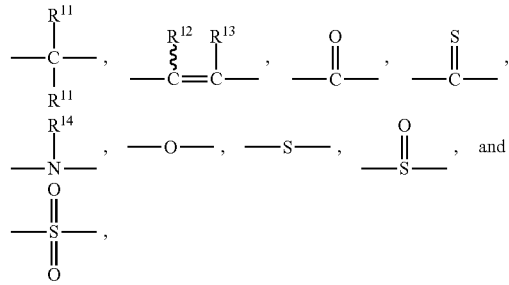

wherein each occurrence of $R^{11}$-$R^{14}$ is independently hydrogen or $C_1$-$C_{12}$ hydrocarbyl, s is 0 or 1, and t and u are each independently 1 to 10; and wherein B is a residue of structure

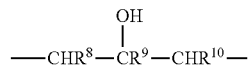

wherein $R^8$ to $R^{10}$ are each independently hydrogen, or $C_1$-$C_{12}$ hydrocarbyl; and wherein n is about 1 to about 60.

4. The composition of claim 1,
  wherein the at least one poly(phenylene ether) block has the structure

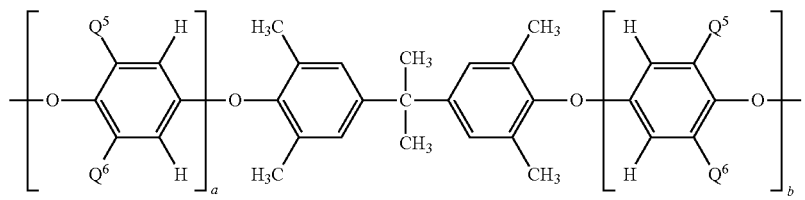

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and
  wherein the at least one poly(hydroxy ether) block has the structure

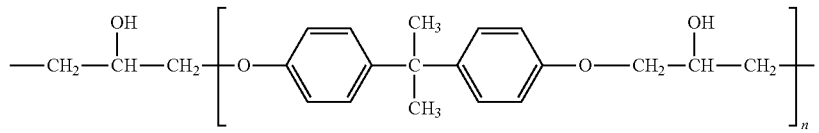

wherein n is about 1 to about 60.

5. The composition of claim 1, wherein the non-polar polymer is selected from the group consisting of poly(phenylene ether)s, and combinations of poly(phenylene ether)s with one or more of unhydrogenated block copolymers of alkenyl aromatic compounds and conjugated dienes, hydrogenated block copolymers of alkenyl aromatic compounds and conjugated dienes, and poly(alkenyl aromatic)s.

6. The composition of claim 1, wherein the non-polar polymer is selected from the group consisting of combinations of poly(phenylene ether)s and poly(alkenyl aromatic)s, optionally in further combination with one or more of unhydrogenated block copolymers of alkenyl aromatic compounds and conjugated dienes, and hydrogenated block copolymers of alkenyl aromatic compounds and conjugated dienes.

7. The composition of claim 1, wherein the non-polar polymer is selected from the group consisting of combinations of poly(phenylene ether)s and hydrogenated block copolymers of alkenyl aromatic compounds and conjugated dienes, optionally in further combination with one or more of unhydrogenated block copolymers of alkenyl aromatic compounds and conjugated dienes, and poly(alkenyl aromatic)s.

8. The composition of claim 1, wherein the non-polar polymer is selected from the group consisting of combinations of poly(phenylene ether)s and unhydrogenated block copolymers of alkenyl aromatic compounds and conjugated dienes, optionally in further combination with one or more of hydrogenated block copolymers of alkenyl aromatic compounds and conjugated dienes, and poly(alkenyl aromatic)s.

9. The composition of claim 1, wherein the polar filler is selected from the group consisting of glass fibers and combinations of glass fibers with one or more of glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, and ceramic fibers.

10. The composition of claim 1, wherein the polar filler is selected from the group consisting of clays, talcs, micas, and combinations thereof, optionally in further combination with one or more of glass fibers, glass flakes, glass beads, silicas, aluminas, titanium dioxides, wollastonites, calcium carbonates, calcium sulfates, barium sulfates, dolomites, processed mineral fibers, metal oxides, metal hydroxides, and ceramic fibers.

11. The composition of claim 1, wherein the polar filler is surface-treated polar filler that is the product of a process comprising treating a polar filler with a surface treatment agent selected from the group consisting of γ-aminopropyltrialkoxysilanes, γ-(meth)acryloxypropyltrialkoxysilanes, β-(3,4-epoxycyclohexyl)ethyltrialkoxysiloxanes, and combinations thereof.

12. The composition of claim 1, wherein the non-polar polymer is selected from the group consisting of poly(alkenyl aromatic)s, and combinations of poly(alkenyl aromatic)s with one or more of unhydrogenated block copolymers of alkenyl aromatic compounds and conjugated dienes, hydrogenated block copolymers of alkenyl aromatic compounds and conjugated dienes, and poly(phenylene ether)s.

13. The composition of claim 12, wherein the poly(alkenyl aromatic) is selected from the group consisting of atactic homopolystyrenes, syndiotactic homopolystyrenes, rubber-modified polystyrenes, and combinations thereof.

14. The composition of claim 12, wherein the poly(alkenyl aromatic) is an atactic homopolystyrene.

15. The composition of claim 12, wherein the poly(alkenyl aromatic) is a syndiotactic homopolystyrene.

16. A composition comprising:
about 35 to about 90 weight percent of a poly(alkenyl aromatic);
about 5 to about 45 weight percent of glass fibers; and
about 5 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein the at least one poly(phenylene ether) block has the structure

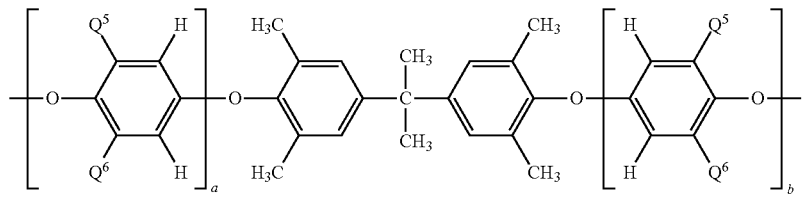

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure wherein n is about 1 to about 60;
wherein all weight percents are based on the total weight of the composition, unless a different weight basis is specified.

17. A composition comprising:
about 35 to about 90 weight percent of a poly(phenylene ether);
about 5 to about 45 weight percent of glass fibers; and
about 5 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein the at least one poly(phenylene ether) block has the structure

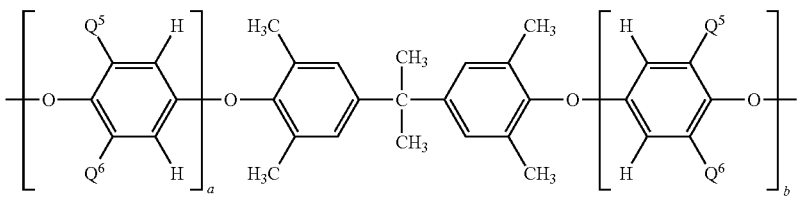

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

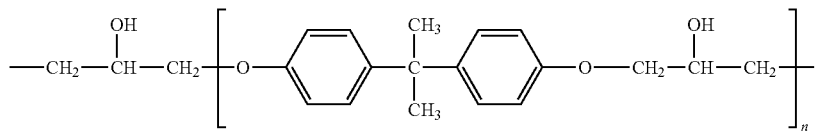

wherein n is about 1 to about 60;
  wherein all weight percents are based on the total weight of the composition, unless a different weight basis is specified.

18. The composition of claim 17, further comprising about 5 to about 55 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, and combinations thereof.

19. An article comprising the composition of claim 1.

20. A method of forming a composition, comprising:
  blending
    about 30 to about 93 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof,
    about 5 to about 50 weight percent of polar filler selected from the group consisting of glass fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof, and
    about 2 to about 20 weight percent of a poly(phenylene ether)-poly(hydroxy ether) block copolymer comprising at least one poly(hydroxy ether) block, and at least one poly(phenylene ether) block, wherein the mole ratio of poly(hydroxy ether) blocks to poly(phenylene ether) blocks is 0.95:1 to 1.00:1
  to form a composition;
  wherein all weight percents are based on the total weight of the composition, unless a different weight basis is specified.

* * * * *